United States Patent
Guan et al.

(10) Patent No.: US 10,897,331 B2
(45) Date of Patent: Jan. 19, 2021

(54) DATA TRANSMISSION METHOD AND APPARATUS

(71) Applicant: HUAWEI TECHNOLOGIES CO., LTD., Guangdong (CN)

(72) Inventors: Lei Guan, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/505,149

(22) Filed: Jul. 8, 2019

(65) Prior Publication Data

US 2019/0334664 A1 Oct. 31, 2019

Related U.S. Application Data

(63) Continuation of application No. PCT/CN2018/071782, filed on Jan. 8, 2018.

(30) Foreign Application Priority Data

Jan. 7, 2017 (CN) .......................... 2017 1 0014619
Mar. 21, 2017 (CN) .......................... 2017 1 0170033

(51) Int. Cl.
*H04L 1/18* (2006.01)
*H04W 28/04* (2009.01)

(52) U.S. Cl.
CPC .......... *H04L 1/1887* (2013.01); *H04L 1/1812* (2013.01); *H04W 28/04* (2013.01)

(58) Field of Classification Search
None
See application file for complete search history.

(56) References Cited

U.S. PATENT DOCUMENTS 10,298,362 B2 * 5/2019 Yeo ...................... H04L 1/1812
2012/0002657 A1 1/2012 Seyama et al.
(Continued)

FOREIGN PATENT DOCUMENTS

CN 101615986 A 12/2009
CN 104283651 A 1/2015
(Continued)

OTHER PUBLICATIONS

R1-1609561—MediaTek Inc., "Consideration on HARQ mechanism in NR," 3GPP TSG RAN WG1 Meeting #86bis, Lisbon, Portugal, Oct. 10-14, 2016, 5 pages.

(Continued)

*Primary Examiner* — Yaotang Wang
(74) *Attorney, Agent, or Firm* — Fish & Richardson P.C.

(57) ABSTRACT

The present disclosure relates to data transmission methods and apparatus. One example method includes sending, by a radio access network device, a first transport block to a terminal device, where the first transport block includes at least two code blocks, the at least two code blocks are divided into at least two different code block sets, and each code block set includes at least one of the at least two code blocks, and receiving, by the radio access network device, first feedback information sent by the terminal device, where the first feedback information includes at least two pieces of feedback information corresponding to the first transport block, and the at least two pieces of feedback information are respectively used to indicate receiving statuses of the at least two code block sets.

20 Claims, 6 Drawing Sheets

(56) References Cited

U.S. PATENT DOCUMENTS

| | | | | |
|---|---|---|---|---|
| 2014/0133471 | A1* | 5/2014 | Nammi | H04L 1/06 |
| | | | | 370/336 |
| 2016/0226643 | A1 | 8/2016 | Mallik et al. | |
| 2016/0359591 | A1* | 12/2016 | Yellapantula | H04L 1/203 |
| 2017/0251461 | A1* | 8/2017 | Parkvall | H04W 72/1289 |
| 2017/0303284 | A1 | 10/2017 | Xu et al. | |
| 2019/0020445 | A1* | 1/2019 | Kim | H04L 1/1861 |
| 2019/0132087 | A1* | 5/2019 | Wu | H04L 5/0055 |

FOREIGN PATENT DOCUMENTS

| | | | |
|---|---|---|---|
| CN | 104301077 | A | 1/2015 |
| CN | 105515733 | A | 4/2016 |
| CN | 107210869 | A | 9/2017 |
| EP | 2413627 | A1 | 2/2012 |
| WO | 2010109521 | A1 | 9/2010 |
| WO | 2016126330 | A1 | 8/2016 |
| WO | 2016126653 | A1 | 8/2016 |

OTHER PUBLICATIONS

R1-1702815—NTT Docomo, Inc., "Views on HARQ enhancements for NR," 3GPP TSG RAN WG1 Meeting #88, Athens, Greece, Feb. 13-17, 2017, 4 pages.

3GPP TS 36.212 V13.4.0 (Dec. 2016), "3rd Generation Partnership Project; Technical Specification Group Radio Access Network; Evolved Universal Terrestrial Radio Access (E-UTRA); Multiplexing and channel coding (Release 13)," Technical Specification, Dec. 2016, 140 pages.

International Search Report and Written Opinion issued in International Application No. PCT/CN2018/071782 dated Mar. 27, 2018, 15 pages (with English translation).

Qualcomm Incorporated, "UCI content," 3GPP TSG-RAN WG1 #87, R1-1612072, Reno, USA, Nov. 14-18, 2016, 3 pages.

Office Action issued in Japanese Application No. 2019-537125 dated Sep. 8, 2020, 5 pages (with English translation).

Extended European Search Report and Written Opinion issued in European Application No. 18735823.9 dated Jul. 28, 2020, 7 pages.

* cited by examiner

Resource occupied by a CB 1

| | 1 | 5 | 9 | 13 | 17 | 21 | 25 | 29 | 33 | 37 | 41 | 45 |
|---|---|---|---|---|---|---|---|---|---|---|---|---|
| | 2 | 6 | 10 | 14 | 18 | 22 | 26 | 30 | 34 | 38 | 42 | 46 |
| | 3 | 7 | 11 | 15 | 19 | 23 | 27 | 31 | 35 | 39 | 43 | 47 |
| | 4 | 8 | 12 | 16 | 20 | 24 | 28 | 32 | 36 | 40 | 44 | 48 |

Frequency domain division

Control channel

DATA TRANSMISSION METHOD AND APPARATUS

CROSS-REFERENCE TO RELATED APPLICATIONS

This application is a continuation of International Application No. PCT/CN2018/071782, filed on Jan. 8, 2018, which claims priority to Chinese Patent Application No. 201710170033.4, filed on Mar. 21, 2017 and Chinese Patent Application No. 201710014619.1, filed on Jan. 7, 2017. All of the aforementioned patent applications are hereby incorporated by reference in their entireties.

TECHNICAL FIELD

The present invention relates to the field of mobile communications, and in particular, to a data transmission method and an apparatus.

BACKGROUND

In an LTE (Long Term Evolution) system, a downlink and an uplink are respectively based on OFDMA (Orthogonal Frequency Division Multiple Access) and SC-FDMA (Single carrier-Frequency Division Multiple Access). A time-frequency resource is divided into OFDM (orthogonal frequency division multiplexing) symbols or SC-FDMA symbols (an OFDM symbol or an SC-FDMA symbol is alternatively referred to as a time domain symbol) in time domain and subcarriers in frequency domain. A minimal resource granularity at which the time-frequency resource is divided is referred to as an RE (resource element), that is, a time-frequency grid point including one time domain symbol in time domain and one subcarrier in frequency domain. A basic structure of a typical time-frequency resource in the LTE system is a 15 KHz subcarrier spacing, approximately 70 μs duration of a time domain symbol, and 4 μs to 6 μs duration of a cyclic prefix.

In the LTE system, service transmission is based on scheduling of a base station. When an upper layer data packet is scheduled at a physical layer, the upper layer data packet is divided into small data packets in a form of transport blocks (TB). A basic time unit of scheduling generally is one subframe. Duration of one subframe is 1 ms, one subframe generally includes two slots, and one slot generally includes seven time domain symbols. In an LTE evolved system, a shorter scheduling time unit may be further introduced. For example, a scheduling manner in which one slot or even several time domain symbols are used as a unit may be introduced. Generally, a specific scheduling process includes the following steps: A base station transmits a control channel, for example, a PDCCH (physical downlink control channel); UE detects the control channel in a subframe, and receives a transport block on a downlink data channel or sends a transport block on an uplink data channel based on scheduling information carried on the detected control channel. The control channel may carry scheduling information of a downlink data channel (for example, a physical downlink shared channel, PDSCH) or an uplink data channel (for example, a physical uplink shared channel, PUSCH). The scheduling information includes control information such as resource allocation information, a modulation and coding scheme, and a HARQ.

The LTE system supports two duplex modes: FDD (frequency division duplex) and TDD (time division duplex). For an FDD system, downlink transmission and uplink transmission are performed on different subcarriers. For a TDD system, uplink transmission and downlink transmission are performed on a same subcarrier in different times. Specifically, one subcarrier corresponds to a downlink subframe, an uplink subframe, and a special subframe. The special subframe includes three parts: a DwPTS (downlink pilot timeslot), a GP (Guard Period, guard period), and an UpPTS (uplink pilot timeslot). The GP is mainly used for compensation for a downlink-to-uplink component transition time and a propagation delay. The LTE system currently supports seven different TDD uplink and downlink configurations, and for different uplink and downlink configurations, ratios of a quantity of uplink subframes to a quantity of downlink subframes are usually different.

In LTE, a HARQ mechanism is used, and ACK or NACK feedback and HARQ retransmission in the LTE system are performed based on a transport block. Using a downlink as an example, after receiving a transport block carried on a PDSCH, if the UE correctly receives the transport block, the UE feeds back an ACK on an uplink; or if the UE incorrectly receives the transport block, the UE feeds back a NACK on an uplink. If a base station receives the NACK fed back by the UE, the base station subsequently resends, to the UE, the transport block carried in a previous PDSCH transmission, and the UE may perform HARQ combination on receiving information of the transport block on the PDSCH received again and receiving information of the transport block that is previously incorrectly received, to improve receiving performance.

Currently, discussion about a 5G (5th Generation) technology has been started. 5G may be divided into two branches from the perspective of compatibility. One branch is continuous evolution compatible with LTE 4G (4th Generation), and the other branch is new radio NR incompatible with LTE. For the two branches, 5G includes two important technical requirements: mobile broadband continuously enhanced eMBB (Enhanced Mobile Broadband) and ultra-reliable and low latency communications URLLC (ultra-reliable and low latency communications). For the eMBB, 5G needs to reach a data rate higher than that of 4G. Therefore, a larger transport block may be introduced. Considering that an LDPC (low-density parity-check code) having a higher degree of parallelism may be introduced, compared with 4G, one TB in 5G is divided into more CBs (code block). For the URLLC, to meet latency and reliability requirements thereof, a priority of burst transmission of the URLLC needs to be higher than that of the eMBB. Therefore, short-time puncturing may be performed for the URLLC on an eMBB transport block that is being transmitted, and as a result, a few CBs in the eMBB TB cannot be correctly received by eMBB UE due to the puncturing for the URLLC.

Therefore, in a 5G system design, one TB may be divided into more CBs, and puncturing may be performed for a burst URLLC emergency service on an eMBB service that is being transmitted. In a conventional TB-based HARQ feedback and retransmission mechanism, data transmission efficiency is reduced, and system transmission efficiency is affected.

SUMMARY

This application discloses a data transmission method and an apparatus, to provide a more efficient data transmission processing method.

According to one aspect, an embodiment of the present invention provides a data transmission method, including:

sending, by a radio access network device, a first transport block to a terminal device, where the first transport block includes at least two code blocks, the at least two code blocks are divided into at least two different code block sets based on a division manner, and each code block set includes at least one of the at least two code blocks; and receiving, by the radio access network device, first feedback information sent by the terminal device, where the first feedback information includes at least two pieces of feedback information corresponding to the first transport block, and the at least two pieces of feedback information are respectively used to indicate receiving statuses of the at least two code block sets.

Optionally, the method further includes: sending, by the radio access network device, a retransmitted code block to the terminal device, where the retransmitted code block includes some or all of code blocks included in a code block set corresponding to negative acknowledgement information in the first feedback information; and receiving, by the radio access network device, second feedback information sent by the terminal device, where the second feedback information includes feedback information that corresponds to the retransmitted code block and that is used to indicate a receiving status.

Optionally, the method further includes: sending, by the radio access network device, retransmission indication information to the terminal device, where the retransmission indication information is used to determine the retransmitted code block.

Optionally, the at least two code blocks occupy a first time-frequency resource, the first time-frequency resource includes at least two resource regions, the at least two resource regions correspond to the at least two code block sets, the code block included in each code block set occupies a resource region corresponding to the code block set of the code block, and the division manner is one of the following plurality of division manners:

the at least two resource regions are located in different time domains;

the at least two resource regions are located in different frequency domains;

time domain and/or frequency domain resources occupied by the at least two resource regions are not completely the same; and the at least two resource regions include at least one first-type region and at least one second-type region, the first-type region corresponds to a particular code block set, the second-type region does not correspond to the particular code block set, and the particular code block set belongs to the at least two code block sets; or the at least two resource regions include at least one first-type region and at least one second-type region, the first-type region supports transmission of a first-type service, and the second-type region does not support the transmission of the first-type service.

Optionally, when the at least two resource regions are located in different time domains, a quantity of time domain resources occupied by the resource region in an earlier time is greater than a quantity of time domain resources occupied by the resource region in a later time.

Optionally, the at least two code block sets include a first-type code block set and a second-type code block set, and the first-type code block set and the second-type code block set include at least one same code block.

Optionally, when the radio access network device supports the plurality of division manners, the method further includes:

sending, by the radio access network device to the terminal device, first scheduling information used to schedule the first transport block, where the first scheduling information includes a division indication, and the division indication is used to indicate one of the plurality of division manners; or sending, by the radio access network device, higher layer signaling to the terminal device, where the higher layer signaling includes a division indication, and the division indication is used to indicate one of the plurality of division manners.

Optionally, the method further includes: sending, by the radio access network device to the terminal device, second scheduling information used to schedule the retransmitted code block, where the second scheduling information includes the retransmission indication information.

Optionally, the first scheduling information and the second scheduling information are carried on control channels in a same downlink control information format, and a first field that is in the downlink control information format and that is used by the division indication and a second field that is in the downlink control information format and that is used by the retransmission indication information include a same field.

Optionally, the retransmission indication information is further used to indicate whether HARQ combination can be performed on all or some of code blocks in the retransmitted code block.

Optionally, the method further includes:

the first feedback information further includes feedback information used to indicate a receiving status of the first transport block; and/or the second feedback information further includes feedback information used to indicate a receiving status of the first transport block.

According to another aspect, an embodiment of the present invention provides a data transmission method, including:

receiving, by a terminal device, a first transport block sent by a radio access network device, where the first transport block includes at least two code blocks, the at least two code blocks are divided into at least two different code block sets based on a division manner, and each code block set includes at least one of the at least two code blocks; and sending, by the terminal device, first feedback information to the radio access network device, where the first feedback information includes at least two pieces of feedback information corresponding to the first transport block, and the at least two pieces of feedback information are respectively used to indicate receiving statuses of the at least two code block sets.

Optionally, the method further includes: receiving, by the terminal device, a retransmitted code block sent by the radio access network device, where the retransmitted code block includes some or all of code blocks included in a code block set corresponding to negative acknowledgement information in the first feedback information; and sending, by the terminal device, second feedback information to the radio access network device, where the second feedback information includes feedback information that corresponds to the retransmitted code block and that is used to indicate a receiving status.

Optionally, the method further includes: receiving, by the terminal device, retransmission indication information sent by the radio access network device, where the retransmission indication information is used to determine the retransmitted code block; and receiving, by the terminal device, the retransmitted code block based on the division manner and the retransmission indication information.

Optionally, the at least two code blocks occupy a first time-frequency resource, the first time-frequency resource includes at least two resource regions, the at least two resource regions correspond to the at least two code block sets, the code block included in each code block set occupies a resource region corresponding to the code block set of the code block, and the division manner is one of the following plurality of division manners:

the at least two resource regions are located in different time domains;

the at least two resource regions are located in different frequency domains;

time domain and/or frequency domain resources occupied by the at least two resource regions are not completely the same; and the at least two resource regions include at least one first-type region and at least one second-type region, the first-type region corresponds to a particular code block set, the second-type region does not correspond to the particular code block set, and the particular code block set belongs to the at least two code block sets; or the at least two resource regions include at least one first-type region and at least one second-type region, the first-type region supports transmission of a first-type service, and the second-type region does not support the transmission of the first-type service.

Optionally, when the at least two resource regions are located in different time domains, a quantity of time domain resources occupied by the resource region in an earlier time is greater than a quantity of time domain resources occupied by the resource region in a later time.

Optionally, the at least two code block sets include a first-type code block set and a second-type code block set, and the first-type code block set and the second-type code block set include at least one same code block.

Optionally, when the radio access network device supports the plurality of division manners, the method further includes:

receiving, by the terminal device, first scheduling information that is sent by the radio access network device and that is used to schedule the first transport block, where the first scheduling information includes a division indication, and the division indication is used to indicate one of the plurality of division manners; or receiving, by the terminal device, higher layer signaling sent by the radio access network device, where the higher layer signaling includes a division indication, and the division indication is used to indicate one of the plurality of division manners.

Optionally, the method further includes: receiving, by the terminal device, second scheduling information that is sent by the radio access network device and that is used to schedule the retransmitted code block, where the second scheduling information includes the retransmission indication information.

Optionally, the first scheduling information and the second scheduling information are carried on control channels in a same downlink control information format, and a first field that is in the downlink control information format and that is used by the division indication and a second field that is in the downlink control information format and that is used by the retransmission indication information include a same field.

Optionally, the retransmission indication information is further used to indicate whether HARQ combination can be performed on all or some of code blocks in the retransmitted code block.

Optionally, the first feedback information further includes feedback information used to indicate a receiving status of the first transport block; and/or the second feedback information further includes feedback information used to indicate a receiving status of the first transport block.

According to another aspect, an embodiment of the present invention provides a radio access network device, including:

a processing unit, configured to divide at least two code blocks included in a first transport block into at least two different code block sets based on a division manner, where each code block set includes at least one of the at least two code blocks;

a sending unit, configured to send the first transport block to a terminal device; and a receiving unit, configured to receive first feedback information sent by the terminal device, where the first feedback information includes at least two pieces of feedback information corresponding to the first transport block, and the at least two pieces of feedback information are respectively used to indicate receiving statuses of the at least two code block sets.

Optionally, the sending unit is further configured to send a retransmitted code block to the terminal device, where the retransmitted code block includes some or all of code blocks included in a code block set corresponding to negative acknowledgement information in the first feedback information; and the receiving unit is further configured to receive second feedback information sent by the terminal device, where the second feedback information includes feedback information that corresponds to the retransmitted code block and that is used to indicate a receiving status.

Optionally, the sending unit is further configured to send retransmission indication information to the terminal device, where the retransmission indication information is used to determine the retransmitted code block.

Optionally, the at least two code blocks occupy a first time-frequency resource, the first time-frequency resource includes at least two resource regions, the at least two resource regions correspond to the at least two code block sets, the code block included in each code block set occupies a resource region corresponding to the code block set of the code block, and the division manner is one of the following plurality of division manners:

the at least two resource regions are located in different time domains;

the at least two resource regions are located in different frequency domains;

time domain and/or frequency domain resources occupied by the at least two resource regions are not completely the same; and the at least two resource regions include at least one first-type region and at least one second-type region, the first-type region corresponds to a particular code block set, the second-type region does not correspond to the particular code block set, and the particular code block set belongs to the at least two code block sets; or the at least two resource regions include at least one first-type region and at least one second-type region, the first-type region supports transmission of a first-type service, and the second-type region does not support the transmission of the first-type service.

Optionally, when the at least two resource regions are located in different time domains, a quantity of time domain resources occupied by the resource region in an earlier time is greater than a quantity of time domain resources occupied by the resource region in a later time.

Optionally, the at least two code block sets include a first-type code block set and a second-type code block set, and the first-type code block set and the second-type code block set include at least one same code block.

Optionally, when the radio access network device supports the plurality of division manners, the sending unit is further configured to send, to the terminal device, first scheduling information used to schedule the first transport block, where the first scheduling information includes a division indication, and the division indication is used to indicate one of the plurality of division manners; or the sending unit is further configured to send higher layer signaling to the terminal device, where the higher layer signaling includes a division indication, and the division indication is used to indicate one of the plurality of division manners.

Optionally, the sending unit is further configured to send, to the terminal device, second scheduling information used to schedule the retransmitted code block, where the second scheduling information includes the retransmission indication information.

Optionally, the first scheduling information and the second scheduling information are carried on control channels in a same downlink control information format, and a first field that is in the downlink control information format and that is used by the division indication and a second field that is in the downlink control information format and that is used by the retransmission indication information include a same field.

Optionally, the retransmission indication information is further used to indicate whether HARQ combination can be performed on all or some of code blocks in the retransmitted code block.

Optionally, the first feedback information further includes feedback information used to indicate a receiving status of the first transport block; and/or the second feedback information further includes feedback information used to indicate a receiving status of the first transport block.

According to yet another aspect, an embodiment of the present invention provides a terminal device, including:

a receiving unit, configured to receive a first transport block sent by a radio access network device, where the first transport block includes at least two code blocks, the at least two code blocks are divided into at least two different code block sets based on a division manner, and each code block set includes at least one of the at least two code blocks;

a processing unit, configured to generate first feedback information, where the first feedback information includes at least two pieces of feedback information corresponding to the first transport block, and the at least two pieces of feedback information are respectively used to indicate receiving statuses of the at least two code block sets; and a sending unit, configured to send the first feedback information to the radio access network device.

Optionally, the receiving unit is further configured to receive a retransmitted code block sent by the radio access network device, where the retransmitted code block includes some or all of code blocks included in a code block set corresponding to negative acknowledgement information in the first feedback information; and the sending unit is further configured to send second feedback information to the radio access network device, where the second feedback information includes feedback information that corresponds to the retransmitted code block and that is used to indicate a receiving status.

Optionally, the receiving unit is further configured to receive retransmission indication information sent by the radio access network device, where the retransmission indication information is used to determine the retransmitted code block; and the receiving unit receives the retransmitted code block based on the division manner and the retransmission indication information.

Optionally, the at least two code blocks occupy a first time-frequency resource, the first time-frequency resource includes at least two resource regions, the at least two resource regions correspond to the at least two code block sets, the code block included in each code block set occupies a resource region corresponding to the code block set of the code block, and the division manner is one of the following plurality of division manners:

the at least two resource regions are located in different time domains;

the at least two resource regions are located in different frequency domains;

time domain and/or frequency domain resources occupied by the at least two resource regions are not completely the same; and the at least two resource regions include at least one first-type region and at least one second-type region, the first-type region corresponds to a particular code block set, the second-type region does not correspond to the particular code block set, and the particular code block set belongs to the at least two code block sets; or the at least two resource regions include at least one first-type region and at least one second-type region, the first-type region supports transmission of a first-type service, and the second-type region does not support the transmission of the first-type service.

Optionally, when the at least two resource regions are located in different time domains, a quantity of time domain resources occupied by the resource region in an earlier time is greater than a quantity of time domain resources occupied by the resource region in a later time.

Optionally, the at least two code block sets include a first-type code block set and a second-type code block set, and the first-type code block set and the second-type code block set include at least one same code block.

Optionally, when the radio access network device supports the plurality of division manners, the receiving unit is further configured to receive first scheduling information that is sent by the radio access network device and that is used to schedule the first transport block, where the first scheduling information includes a division indication, and the division indication is used to indicate one of the plurality of division manners; or the receiving unit is further configured to receive higher layer signaling sent by the radio access network device, where the higher layer signaling includes a division indication, and the division indication is used to indicate one of the plurality of division manners.

Optionally, the receiving unit is further configured to receive second scheduling information that is sent by the radio access network device and that is used to schedule the retransmitted code block, where the second scheduling information includes the retransmission indication information.

Optionally, the first scheduling information and the second scheduling information are carried on control channels in a same downlink control information format, and a first field that is in the downlink control information format and that is used by the division indication and a second field that is in the downlink control information format and that is used by the retransmission indication information include a same field.

Optionally, the retransmission indication information is further used to indicate whether HARQ combination can be performed on all or some of code blocks in the retransmitted code block.

Optionally, the first feedback information further includes feedback information used to indicate a receiving status of the first transport block; and/or the second feedback information further includes feedback information used to indicate a receiving status of the first transport block.

According to still yet another aspect, an embodiment of the present invention provides a communications system. The system includes the radio access network device and the terminal device in the foregoing aspects.

According to a further aspect, this application provides a computer readable storage medium. The computer readable storage medium stores an instruction, and when the instruction runs on a computer, the computer performs the methods in the foregoing aspects.

According to a still further aspect, this application provides a computer program product including an instruction. When the computer program product runs on a computer, the computer performs the methods in the foregoing aspects.

According to the solutions provided in the present invention, because a transport block is divided into at least two different code block sets, the terminal device respectively feeds back receiving statuses of the at least two different code block sets, and the radio access network device may retransmit only a code block set that is not correctly received, so that HARQ retransmission of all code block sets in the transport block caused because some code block sets are incorrectly received is avoided, and data transmission efficiency is improved.

DESCRIPTION OF EMBODIMENTS

The following describes technical solutions in embodiments of the present invention with reference to accompanying drawings.

Figures 1, 2A:
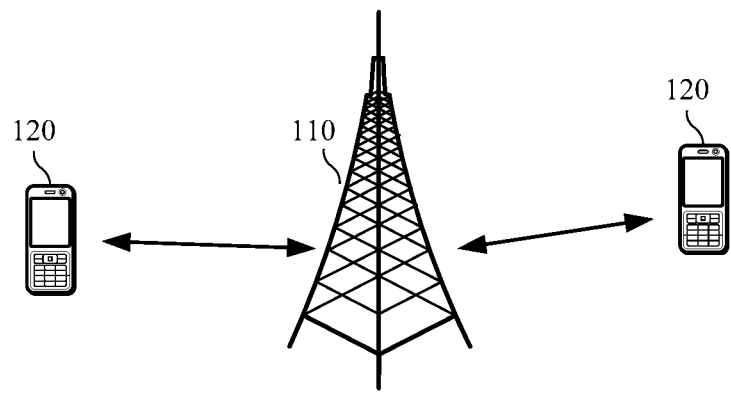
FIG. 1 is a schematic diagram of a possible application scenario according to the present invention.
FIG. 2(a) and FIG. 2(b) are schematic diagrams showing that a transport block includes a plurality of code blocks.

FIG. 1 shows a communications system 100 to which the embodiments of the present invention are applied. The communications system 100 may include at least one radio access network device 110 and a plurality of terminal devices 120 located in coverage of the radio access network device 110. FIG. 1 shows one radio access network device and two terminal devices, which are used as an example. Optionally, the communications system 100 may include a plurality of radio access network devices, and coverage of each radio access network device may include another quantity of terminal devices. This is not limited in the embodiments of the present invention.

Optionally, the wireless communications system 100 may further include another network entity such as a network controller or a mobility management entity. This is not limited in the embodiments of the present invention.

The communications system to which the embodiments of the present invention are applied may be a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), another wireless communications system using an orthogonal frequency division multiplexing (OFDM) technology is applied, or the like. A system architecture and a service scenario described in the embodiments of the present invention aim to more clearly describe the technical solutions in the embodiments of the present invention, but are not intended to limit the technical solutions provided in the embodiments of the present invention. A person of ordinary skill in the art may know that as the network architecture evolves and a new service scenario emerges, the technical solutions provided in the embodiments of the present invention are further applicable to a similar technical problem.

The radio access network device in the embodiments of the present invention may be configured to provide a wireless communication function for the terminal device. The radio access network device may include a macro base station, a micro base station (also referred to as a small cell), a relay station, or an access point, and the like in various forms. The radio access network device may be a base transceiver station (BTS) in GSM or CDMA, or may be a NodeB (NB) in WCDMA, or may be an evolved NodeB (eNB or e-NodeB) in LTE, or may be a corresponding device gNB in a 5G network. For ease of description, in all the embodiments of the present invention, all the foregoing apparatuses that provide a wireless communication function for the terminal device are collectively referred to as the radio access network device.

In the embodiments of the present invention, the terminal device may also be referred to as user equipment (UE), a mobile station (MS), a mobile terminal (Mobile Terminal), or the like. The terminal device may communicate with one or more core networks through a radio access network (RAN). For example, the terminal device may be a mobile phone (or referred to as a "cellular" phone), or a computer having a mobile terminal. For example, the terminal device may be a portable, pocket-sized, handheld, computer built-in, or in-vehicle mobile apparatus, and exchanges language and/or data with the radio access network. This is not specifically limited in the embodiments of the present invention.

In the LTE system, ACK or NACK feedback and HARQ retransmission are performed based on a transport block. Considering coding and decoding complexity and advantages of rapid coding and decoding, one transport block TB may be divided into a plurality of code blocks CBs for separate channel coding and decoding. For example, for a Turbo code, a quantity of bits in a largest CB generally is 6144. If a quantity of bits in one TB exceeds 6144, the TB needs to be split into a plurality of CBs for separate coding and decoding. For LDPC (low-density parity-check), a quantity of bits in a largest CB is approximately 2000. One TB may be split into more CBs for parallel coding and decoding. Generally, each CB has an independent check function. Using the Turbo code as an example. A CB CRC (cyclic redundancy check) is added to each CB before coding. In this way, after UE decodes each CB, it may be determined, through the CRC check, whether a current CB is correctly decoded. For the LDPC, a CB CRC may also be added to each CB, or a coding matrix of the LDPC has a check function, that is, each CB of the LDPC has a check function. Therefore, if some CBs in a TB are not correctly received, the UE feeds back a NACK to a base station, and the base station subsequently performs HARQ retransmission on the entire TB (including all CBs in the TB).

In a continuously evolved system of LTE or an NR system, one TB may be divided into more CBs. If a small quantity of CBs in the TB are not correctly received, but the other CBs all are correctly received, efficiency of the conventional TB-based HARQ feedback and retransmission is reduced, and system transmission efficiency is affected.

In addition, puncturing may be performed for a burst URLLC emergency service on an eMBB service that is being transmitted. Compared with other CBs, a receiving error easily occurs in a punctured CB, and if HARQ feedback and retransmission are still performed based on a TB, for example, all CBs in the TB are retransmitted, system transmission efficiency is affected.

Further, for retransmission of a punctured CB, because the UE cannot learn which CB is punctured for the URLLC during a previous transmission, the UE cannot correctly receive the TB in a HARQ combination manner. Therefore, when the UE feeds back a NACK, a HARQ buffer of the UE may store a URLLC service rather than a CB of the UE. As a result, when HARQ combination with the retransmitted CB is performed, a HARQ combination gain cannot be obtained, and even the CB cannot be correctly received. Finally, RLC layer retransmission may be triggered, and consequently, system efficiency is greatly reduced.

To resolve the foregoing problem, the base station configures a division manner of a TB for the UE and sends the TB. Specifically, a manner of dividing the TB into N CB groups (CBG) may be, for example, a division manner based on a quantity of divided groups, a division manner according to a dimension (time domain and/or frequency domain, or another dimension), or an equal group division manner or an unequal group division manner. The base station retransmits the TB or a CBG. The UE performs a CBG-based HARQ-ACK feedback based on the foregoing division manner of the TB.

The following embodiments are described by using an example in which a basic scheduling time unit is one subframe (for example, duration is 1 ms, and this is not limited herein). Another time domain scheduling granularity is not excluded in the present invention. For example, slot-based or mini-slot-based scheduling, that is, a scheduling granularity having specific duration less than or far less than 1 ms, is introduced.

Using a downlink as an example, a general baseband sending process of a downlink transport block includes the following steps.

(1) Segment original payload information of a TB, that is, divide the TB into a plurality of CBs according to a predefined rule (for example, if a bit quantity exceeds a specific value, the TB is divided into a plurality of CBs; otherwise, there is no need to divide the TB).

(2) Add a CRC bit corresponding to each CB, that is, a CB CRC, to payload of the CB, and add a CRC bit corresponding to all CBs, that is, a TB CRC, to payload including all the CBs.

(3) Separately perform channel coding, for example, a Turbo coding or LDPC coding, on each CB to which a CRC is added, to form a code word. In a non-MIMO mode, the UE generally generates one code word. In a MIMO mode, the UE may generate two code words, that is, original payload information in the two code words is independent of each other. Unless otherwise specially noted in the present invention, it is assumed that the UE generates one code word, and the solution may be directly extended to a case in which the UE generates two code words.

(4) Perform scrambling and constellation modulation on the code word, to form a modulation symbol. Scrambling may be based on an initiating state of a cell identifier and/or a UE identifier and a random or pseudo random function. Constellation modulation generally includes QPSK, 16QAM, 64QAM, 256QAM, and the like.

(5) Map the modulation symbol onto time, frequency, and space physical resources. Specifically, to implement rapid coding and decoding, using the downlink as an example, mapping of a coded modulation symbol onto a physical resource is performed first in frequency domain and then in time domain, and inter-CB interleaving processing is not performed on information obtained after CBs are independently coded, that is, mapping is performed in a sequence of CBs. A benefit of such a manner is as follows: When the UE buffers a CB, the UE may start decoding and does not need to wait until all CBs on a data channel are buffered.

(6) Finally, perform IDFT or IFFT conversion to time domain and then perform sending.

HARQ feedback and retransmission in a conventional LTE system is specific to a TB. Specifically, the UE feeds back one ACK bit only when the UE correctly receives all CBs in the TB (correctly receiving in the present invention is a general description, and means that original payload information is successfully decoded), or the UE feeds back one NACK bit for the TB even if one CB is not correctly received. After the base station receives the NACK feedback, because the base station does not know which CB is correctly received by the UE and which CB is incorrectly received by the UE, the base station may subsequently perform HARQ retransmission on all CBs in the TB even if the UE correctly receives most CBs.

Figure 2B:
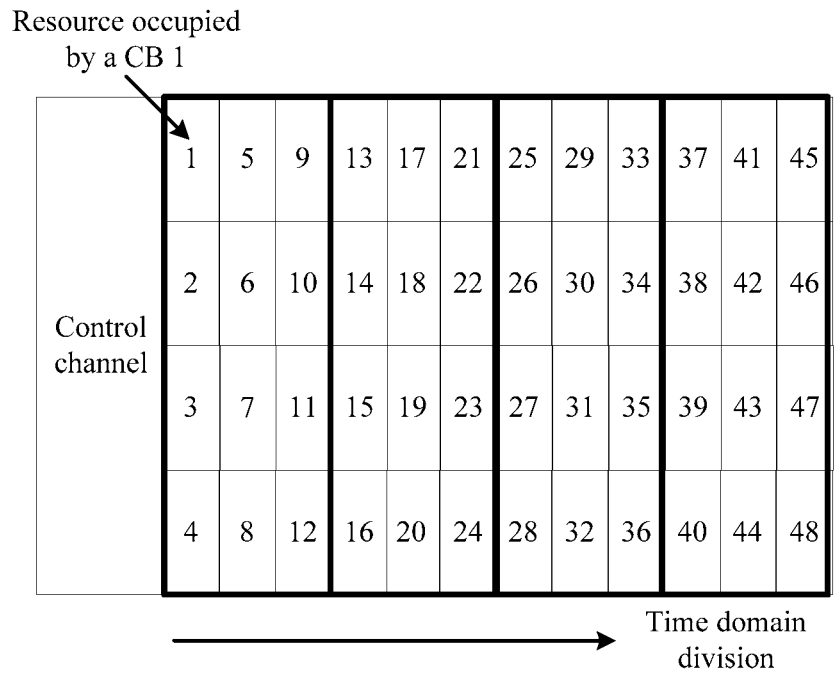

Efficiency of TB-based HARQ feedback and retransmission in the conventional LTE system is not high. Description is provided with reference to FIG. 2(a) and FIG. 2(b), and details are as follows:

(1) Channels and/or interference statuses of various regions of a time-frequency resource may be uncorrelated, or may have little correlation.

From the perspective of a channel, generally, a system bandwidth of wireless communication is increasingly high (currently, a maximum bandwidth of an LTE carrier is 20 MHz, and a carrier having a higher bandwidth may be introduced in the future), and then, channels on neighboring resources far away from each other in frequency domain are uncorrelated, that is, the resources are beyond coverage of related bandwidths of the channels. Thus, frequency domain selective fading of channels at frequency bands is independent. For example, as shown in FIG. 2(a), a channel fading status of a frequency band of a CB 1/5/9 and the like is independent of a channel fading status of a frequency band of a CB 2/6/10 and the like. Therefore, the two groups of CBs are independent of each other in whether the two groups of CBs can be correctly received by the UE. A similar case may be extended to time domain. For example, in FIG. 2(b), a channel time domain fading status of a time of the CB 1/5/9 and the like may be independent of a channel time domain fading status of a time of a CB 13/17/21 and the like (assuming that it is in a high speed scenario).

From the perspective of interference, a neighboring cell may cause different interference to different frequency bands and/or time of a current cell, and similarly, receiving correlations between CBs are different.

(2) In addition to that the receiving correlations between the CBs are analyzed from the perspective of a channel and interference, impact caused by URLLC burst transmission on eMBB data transmission further needs to be considered. For example, puncturing is performed for URLLC data of the current cell on eMBB data, or short-time URLLC sending of the neighboring cell causes short-time burst interference to the current cell. All these affect the receiving correlations between the CBs.

Puncturing means that when URLLC data transmission is mapped to a time-frequency resource, some resources of an eMBB data channel that is being transmitted are occupied by the URLLC data transmission. In this way, although a short delay requirement of a URLLC service is ensured, a performance loss to current eMBB transmission is caused, that is, a CB affected by puncturing may not be correctly received by the UE. In addition to puncturing, there is another manner in which URLLC data transmission does not overwrite eMBB data transmission. Instead, the base station performs both URLLC data transmission and eMBB data transmission. In this way, for the URLLC, performance of the URLLC is lower than that achieved through puncturing. However, for the eMBB, because the eMBB data is transmitted, a status is better than that affected by puncturing. However, eMBB data transmission may receive interference from URLLC data transmission, and in this case, there is still a relatively high probability that the UE cannot correctly receive an affected eMBB CB.

Considering a problem that system transmission efficiency (especially when a TB in the 5G system is divided into more CBs than that in 4G) is reduced when receiving performance of CBs is uncorrelated in the TB-based HARQ feedback and retransmission mechanism in the LTE system, CBG (code block group)-based division and a corresponding HARQ feedback and retransmission mechanism are introduced in this application.

Figure 3:
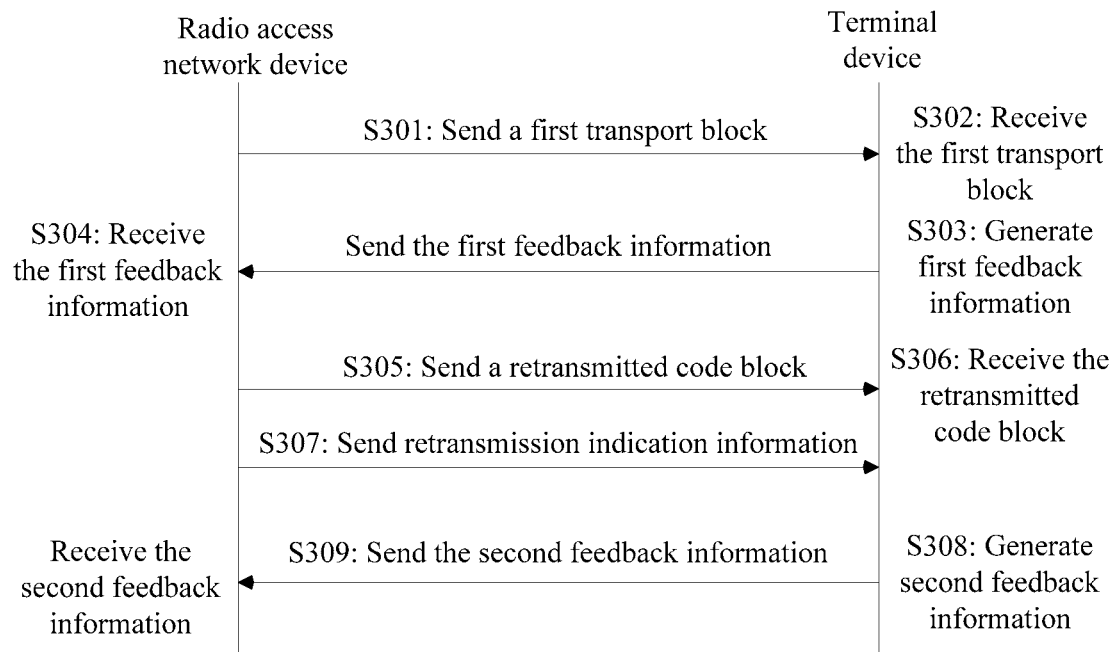
FIG. 3 is a schematic flowchart of an embodiment of a data transmission method according to the present invention.

Referring to FIG. 3, the present invention provides an embodiment of a data transmission method, including the following steps.

S301. A radio access network device sends a first transport block to a terminal device, where the first transport block includes at least two code blocks.

The at least two code blocks are divided into at least two different code block sets based on a division manner, and each code block set includes at least one of the at least two code blocks.

Optionally, the radio access network device sends, to the terminal device, first scheduling information and the first transport block that is scheduled by using the first scheduling information. Specifically, the first scheduling information may be carried on a control channel. The transport block TB scheduled by using the first scheduling information may be sent in HARQ initial transmission, or may be sent in HARQ retransmission (in this case, the entire TB is retransmitted). The present invention is described by using an example in which the TB is sent in the HARQ initial transmission. In addition, the TB includes at least two code blocks CBs. For example, the TB shown in FIG. 2 includes 48 CBs.

S302. The terminal device receives the first transport block sent by the radio access network device.

Optionally, the terminal device receives the first transport block based on the first scheduling information. Specifically, the first scheduling information may include at least one piece of control information corresponding to the first transport block, such as a modulation and coding scheme, time-frequency resource allocation, and a HARQ process number.

Optionally, the terminal device obtains the division manner of the first transport block. For example, the division manner includes a quantity of CBGs into which the first transport block is divided and which CB included in each CBG. Specifically, the division manner may be predefined in the standard, or may be obtained by the terminal device by receiving signaling configuration from the radio access network device. Alternatively, the division manner may be a division manner based on logical sequence numbers of the CBs. For example, a CB 1 to a CB 12 form a CBG 1, a CB 13 to a CB 24 form a CBG 2, a CB 25 to a CB 36 form a CBG 3, and a CB 37 to a CB 48 form a CBG 4. Alternatively, the division manner may be a division manner based on a time-frequency resource occupied by the CBs in the first transport block, for example, a time domain division manner or a frequency domain division manner.

S303. The terminal device generates first feedback information and sends the first feedback information to the radio access network device, where the first feedback information includes at least two pieces of feedback information corresponding to the first transport block, and the at least two pieces of feedback information are respectively used to indicate receiving statuses of at least two code block sets.

The terminal device individually obtains the receiving statuses of the at least two code block sets, and sends the first feedback information to the radio access network device. The terminal device needs to individually obtain feedback information of each code block set. When a code block set is correctly received, feedback information of the code block set is acknowledgement information (ACK); or when a code block set is not correctly received, feedback information of the code block set is negative acknowledgement information (NACK). The first feedback information includes the feedback information of all code block sets in the first transport block.

Optionally, before sending the first feedback information, the terminal device needs to generate the first feedback information based on the foregoing division manner. The division manner based on the logical sequence numbers of the CBs is used as an example. The terminal device needs to generate ACK or NACK feedback information for each of the CBGs 1, 2, 3, and 4. For example, if all CBs in a CBG are correctly decoded, feedback information corresponding to the CBG is an ACK; or if at least one CB in the CBG is not correctly decoded, feedback information corresponding to the CBG is a NACK.

S304. The radio access network device receives the first feedback information sent by the terminal device.

In this embodiment, because the transport block is divided into the at least two different code block sets, the terminal device separately feeds back the receiving statuses of the at least two different code block sets, and the radio access network device may retransmit only a code block set that is not correctly received, so that HARQ retransmission of all code block sets in the transport block caused because some code block sets are incorrectly received is avoided, and data transmission efficiency is improved.

Optionally, the method in this embodiment may further include the following steps.

S305. The radio access network device sends a retransmitted code block and retransmission indication information to the terminal device, where the retransmitted code block includes some or all of code blocks included in a code block set corresponding to negative acknowledgement information in the first feedback information.

If the first feedback information includes negative acknowledgement information of at least one first code block set, the radio access network device sends the retransmitted code block to the terminal device, where the retransmitted code block includes some or all of code blocks included in the first code block set.

S306. The terminal device receives the retransmitted code block.

Specifically, unless otherwise stated in the present invention, receiving is a general description. The receiving may mean that particular information is received, or may mean that information is received and the received information is decoded, demodulated, or the like. For example, if downlink data is correctly received, an ACK is fed back. The receiving herein actually includes that the downlink data is received and the received downlink data is correctly decoded.

Optionally, the radio access network device sends, to the terminal device, second scheduling information used to schedule the retransmitted code block, and the terminal device receives the second scheduling information, where the second scheduling information further includes a modulation and coding scheme, resource allocation information, and the like of the retransmitted code block. The terminal device receives the retransmitted code block based on the second scheduling information.

S308. The terminal device generates second feedback information, where the second feedback information includes feedback information indicating a receiving status of the retransmitted code block.

The terminal device generates the second feedback information based on the receiving status of the retransmitted code block. The terminal device obtains the receiving status of the retransmitted code block, and feeds back the second feedback information based on the receiving status, that is, the second feedback information corresponds to a decoding status of the retransmitted code block. Specifically, if all code blocks in the retransmitted code block are correctly decoded, an ACK is fed back; or if at least one code block in the retransmitted code block is not correctly decoded, a NACK is fed back.

S309. The terminal device sends the second feedback information to the radio access network device.

After receiving the second feedback information, the radio access network device determines whether the retransmitted code block needs to be retransmitted, based on whether the second feedback information includes negative acknowledgement information. Based on different statuses in the received first feedback information and second feedback information, the radio access network device may perform retransmission, or may perform retransmission for a plurality of times until the first transport block is correctly received by the terminal device.

Optionally, the method in this embodiment may further include the following step.

S307. The radio access network device sends the retransmission indication information to the terminal device, and the terminal device receives the retransmission indication information. The retransmission indication information is used to determine the retransmitted code block.

After the terminal device receives the retransmission indication information, in step S306, the terminal device receives and decodes the retransmitted code block based on the division manner and the retransmission indication information.

The radio access network device may further send the retransmission indication information to the terminal device, where the retransmission indication information is used by the terminal device to determine the retransmitted code block based on the retransmission indication information.

The retransmission indication information may be used to indicate a plurality of pieces of information. For example, the retransmission indication information may include at least one of the following: first indication information, second indication information, third indication information, or fourth indication information. It should be noted that any identification information that can indicate the retransmitted code block may form the retransmission indication information.

1. The first indication information is used to indicate the code block set corresponding to the retransmitted code block.

Specifically, it is considered that the at least two code blocks are divided into the at least two different code block sets based on the division manner, and the first feedback information separately corresponds to the divided code block sets, that is, the terminal device feeds back the first feedback information for each CBG or each code block set. Therefore, when the retransmitted code block is indicated, the retransmission indication information sent by the radio access network device may be used to indicate one particular CBG or code block set or several particular CBGs or code block sets corresponding to the retransmitted code block, and feedback information corresponding to the indicated CBG or code block set is a NACK.

Optionally, the first indication information is used to indicate a time-frequency resource occupied by the code block set corresponding to the retransmitted code block. Specifically, the terminal device determines, based on the first indication information, a part of time-frequency resource in a transport block time-frequency resource occupied by the first transport block, where the part of time-frequency resource is a time-frequency resource occupied by one particular CBG(s) or code block set(s). From another perspective, in this case, it is equivalent to dividing the transport block time-frequency resource occupied by the first transport block into a plurality of sub time-frequency resources, and each sub time-frequency resource is a time-frequency resource occupied by each CBG or code block set.

2. The second indication information is used to indicate an identifier, a location, or a sequence number of the retransmitted code block in the first transport block.

Specifically, the second indication information indicates one particular code block or several particular code blocks in the first transport block as the retransmitted code block, for example, indicates the sequence number, the location, or the identifier of the retransmitted code block in the first transport block.

3. The third indication information is used to indicate that the retransmitted code block includes all or some of code blocks in the first transport block.

Specifically, it is equivalent to that the third indication information is used to indicate, in a retransmission mode set, a mode in which some code blocks are retransmitted, and the retransmission mode set includes a mode in which all code blocks are retransmitted and a mode in which some code blocks are retransmitted. If the mode in which all code blocks are retransmitted is indicated, it is equivalent to that the entire first transport block is retransmitted. If the mode in which some code blocks are retransmitted is indicated in this case, it is equivalent to that some code blocks in the first transport block are retransmitted. Next, the terminal device needs to determine which CBG or the code block set is retransmitted in this case. The retransmitted CBG or code block set may be specifically a CBG or code block set corresponding to NACK information in the first feedback information.

4. The fourth indication information is used to indicate HARQ retransmission corresponding to all or some of code block sets in the at least two different code block sets.

Specifically, it is equivalent to that the fourth indication information is used to indicate a HARQ retransmission mode in a HARQ transmission mode set, and the HARQ transmission mode set includes a HARQ initial transmission mode and the HARQ retransmission mode. Optionally, a new data indicator NDI (New Data Indicator) in the scheduling information or an NDI and a HARQ process number may be used for indication. If a status of an NDI changes relative to a previous NDI (changes from 0 to 1), the HARQ initial transmission mode is indicated in this case, and in this case, it is equivalent to that a previous transport block is correctly received. Alternatively, if a status of an NDI has no change relative to a previous NDI (for example, a status of the previous NDI is 0, and a current status of the NDI is also 0), the HARQ retransmission mode is indicated. Next, the terminal device needs to continue to determine which CBG or the code block set is retransmitted in this case. The retransmitted CBG or code block set may be specifically a CBG or code block set corresponding to NACK information in the first feedback information.

In addition, step 306 includes the following specific steps: Before receiving or decoding the retransmitted code block, the terminal device first needs to determine a CBG(s) or code block set(s) in which the retransmitted code block is located, and specifically needs to determine the retransmitted code block based on the foregoing division manner, that is, parsing of the retransmitted code block is different for different division manners; and further needs to determine the retransmitted code block based on the retransmission indication information. For details, refer to descriptions of the following plurality of pieces of indication information.

When the retransmission indication information includes different information, the terminal device receives the retransmitted code block in different manners.

When the retransmission indication information includes the first indication information, the terminal device determines the first code block set in the at least two different code block sets based on the division manner and the retransmission indication information, where the retransmitted code block belongs to the first code block set, and feedback information that corresponds to a receiving status of the first code block set and that is in the first feedback information is negative acknowledgement information. Specifically, the retransmission indication information may indicate a sequence number of the first code block set, or may indicate a time-frequency resource occupied by the first code block set.

When the retransmission indication information includes the second indication information, the terminal device determines a particular code block or some particular code blocks in the first transport block based on the division manner and the retransmission indication information, and uses the determined particular code block or the determined particular code blocks as the retransmitted code block. For example, a sequence number, a location, or an identifier of the retransmitted code block in the first transport block is specifically indicated.

When the retransmission indication information includes the third indication information, the terminal device determines, from the retransmission mode set based on the division manner and the retransmission indication information, the mode in which some code blocks are retransmitted, where the retransmission mode set includes the mode in which some code blocks are retransmitted and the mode in which all code blocks are retransmitted. The terminal device determines, based on the division manner, a second code block set whose receiving status corresponds to feedback information of negative acknowledgement information in the first feedback information, where the retransmitted code block belongs to the second code block set.

When the retransmission indication information includes the fourth indication information, the terminal device determines the HARQ retransmission mode from the HARQ transmission mode set based on the retransmission indication information, where the HARQ transmission mode set includes the HARQ retransmission mode and the HARQ initial transmission mode. The terminal device determines, based on the division manner, a third code block set whose receiving status corresponds to feedback information of negative acknowledgement information in the first feedback information, where the retransmitted code block belongs to the third code block set.

In this embodiment, when a TB includes a large quantity of CBs, according to CBG-based HARQ feedback and retransmission, the radio access network device may retransmit, to the terminal device, only a code block set that is not correctly received, so that HARQ retransmission of all CBs in the entire TB caused because a small quantity of CBs are incorrectly received is avoided, data transmission efficiency is improved, and system transmission efficiency is improved.

The following describes the division manner of the first transport block in the foregoing embodiment.

The code blocks in the first transport block may be divided in a plurality of manners. 1. In one manner, the code blocks in the first transport block may be logically divided based on logical sequence numbers of the CBs. 2. In another manner, the code blocks in the first transport block may be divided based on time-frequency resources occupied by the CBs.

The division manner based on resources occupied by CBs may further include a plurality of manners. Optionally, the at least two code blocks occupy a first time-frequency resource, the first time-frequency resource includes at least two resource regions, the at least two resource regions correspond to the at least two code block sets, the code block included in each code block set occupies a resource region corresponding to the code block set of the code block, and the division manner is one of the following plurality of division manners:

the at least two resource regions are located in different time domains;

the at least two resource regions are located in different frequency domains;

time domain and/or frequency domain resources occupied by the at least two resource regions are not completely the same; and the at least two resource regions include at least one first-type region and at least one second-type region, the first-type region corresponds to a particular code block set, the second-type region does not correspond to the particular code block set, and the particular code block set belongs to the at least two code block sets; or the at least two resource regions include at least one first-type region and at least one second-type region, the first-type region supports transmission of a first-type service, and the second-type region does not support the transmission of the first-type service.

Figure 4:
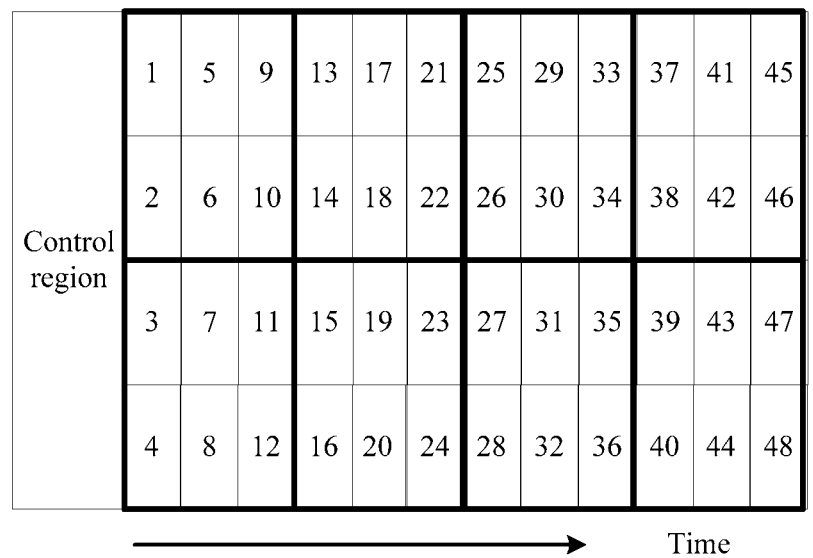
FIG. 4 is a schematic diagram of dividing a first time-frequency resource according to a time dimension according to an embodiment of the present invention.
Figure 5:
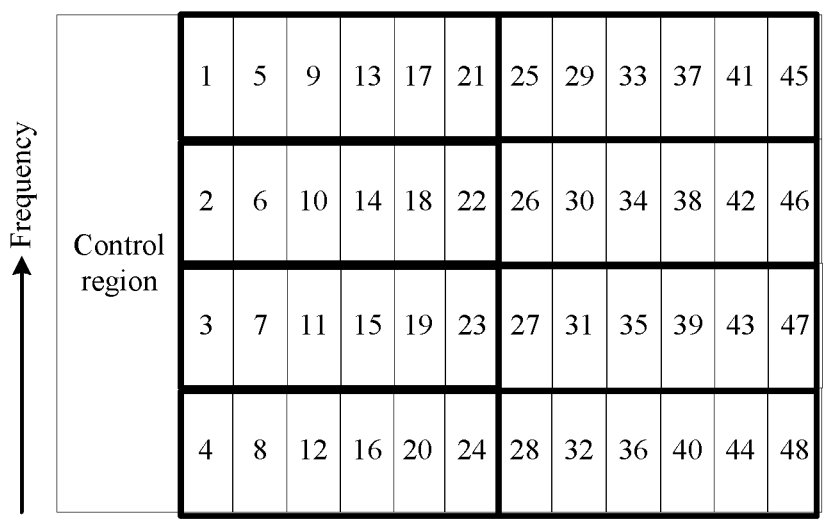
FIG. 5 is a schematic diagram of dividing a first time-frequency resource according to a frequency dimension according to an embodiment of the present invention.

Optionally, several specific candidate division manners are provided. As shown in FIG. 4 and FIG. 5, the first time-frequency resource is divided according to a time dimension and a frequency dimension respectively.

Referring to FIG. 4, the at least two resource regions are located in different time domains. In an implementation, for example, a first TB includes 48 CBs numbered from 1 to 48. The time-frequency resources occupied by the 48 CBs are divided, according to a time dimension, into resources occupied by four CBGs: resources occupied by a CB 1 to a CB 12, resources occupied by a CB 13 to a CB 24, resources occupied by a CB 25 to a CB 36, and resources occupied by a CB 37 to a CB 48. Referring to FIG. 5, the at least two resource regions are located in different frequency domains. In another implementation, for example, the first TB includes 48 CBs numbered from 1 to 48. The time-frequency resources occupied by the 48 CBs are divided, according to a frequency dimension, into resources occupied by four CBGs: resources occupied by CBs {1, 5, 9, 13, 17, 21, 25, 29, 33, 37, 41, 45}, resources occupied by CBs {2, 6, 10, 14, 18, 22, 26, 30, 34, 38, 42, 46}, resources occupied by CBs {3, 7, 11, 15, 19, 23, 27, 31, 35, 39, 43, 47}, and resources occupied by CBs {4, 8, 12, 16, 20, 24, 28, 32, 36, 40, 44, 48}. In addition, a division manner according to both a time dimension and a frequency dimension is similar thereto, that is, is a combination of the embodiment about the division manner according to a time dimension and the embodiment about the division manner according to a frequency dimension.

In addition, another division manner may be further introduced in the present invention for a scenario of reusing eMBB and URLLC resources. Corresponding to a particular code block set and the other code block set, other than the particular code block set, in the at least two code block sets, in another implementation, the particular CBG includes a CB punctured for URLLC or interfered with by URLLC. For example, the CBs 17 to 20 are punctured for the URLLC. Then, the punctured CBs belong to the CBG or code block set including the CB 13 to the CB 24, and the other code block set other than the particular code block set is the other three CBGs or code block sets.

Figure 6:
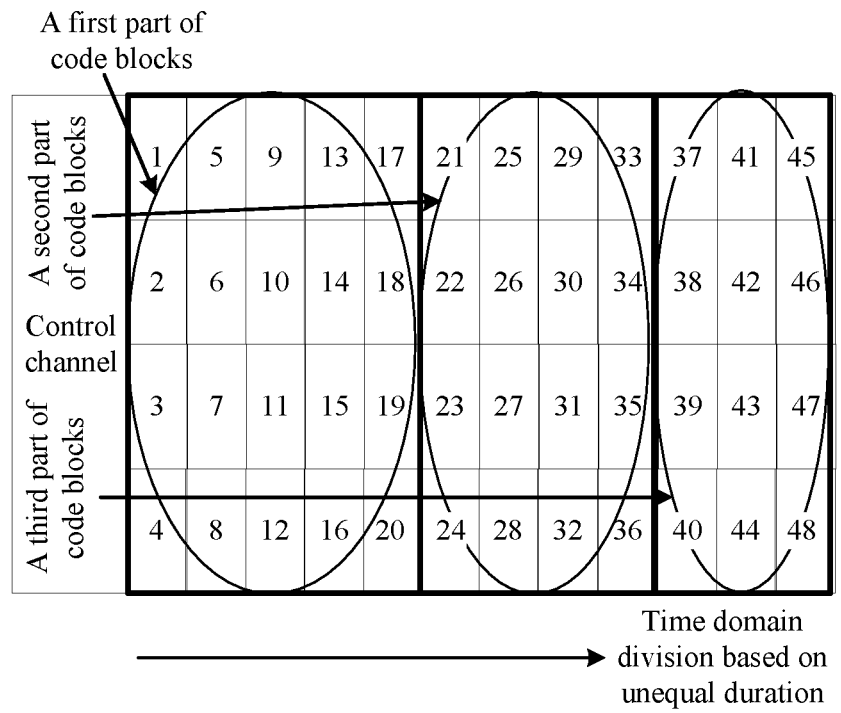
FIG. 6 is a schematic diagram of dividing a first time-frequency resource by using a time division manner based on unequal duration according to an embodiment of the present invention.

For the division manner according to a time dimension, to reduce a feedback delay, a time division manner based on unequal duration may be used, and a time resource occupied by a CB that is sent in an earlier time may be sequentially greater than a time resource occupied by a CB that is sent in a later time. Referring to FIG. 6, in an implementation, the first TB is divided into three CBGs or code block sets: {the CB 1 to the CB 20, the CB 21 to the CB 36, the CB 37 to the CB 48} or {resources occupied by the CB 1 to the CB 20, resources occupied by the CB 21 to the CB 36, resources occupied by the CB 37 to the CB 48}. Further, to reduce impact on eMBB caused by puncturing, inter-CB interleaving may be introduced in each element, for example, interleaving is performed on the CB 1 to the CB 20 in five time domain symbols occupied by the CB 1 to the CB 20. In this way, the impact caused by the puncturing can be shared between the 20 CBs.

In addition to reducing an impact of puncturing, advantages of combining the division manner based on unequal duration and the manner of introducing inter-CB interleaving in an element may further include that a CB that is sent first and that occupies a relatively long time may be buffered first and then decoded first, and a CB that is sent later and that occupies a relatively short time is buffered later and then decoded later. Because a relatively long decoding processing time is reserved for a CB occupying a long time, and a relatively short decoding processing time is reserved for a CB occupying a short time, a HARQ feedback delay can be reduced, and system transmission efficiency can be improved.

Figure 7:
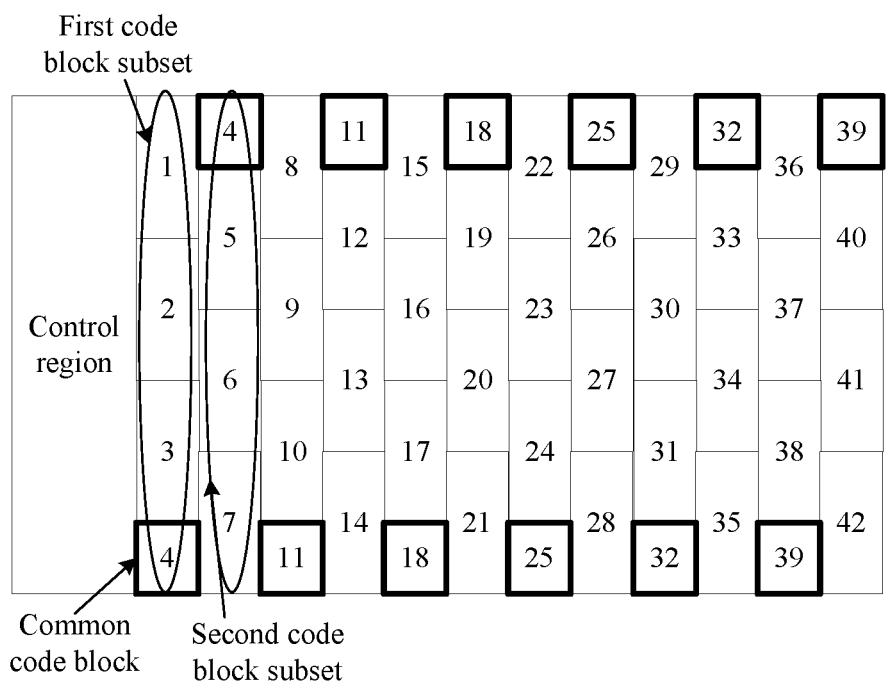
FIG. 7 is a schematic diagram showing that different code block groups partially overlap according to an embodiment of the present invention.

In the foregoing division manner, considering that mapping is performed for a plurality of CBs first by frequency and then by time, there may be a case in which a resource occupied by one CB crosses different time domain symbols, and further possibly crosses inter-element resources. Referring to FIG. 7, it is assumed that the first TB is divided into 12 CBGs or code block sets, respectively corresponding to 12 time domain symbols. Then, it can be learned that the CB 4 belongs to both a first CBG and a second CBG, that is, the CB 4 is a common CB between a CBG {CBs 1, 2, 3, 4} and a CBG {CBs 4, 5, 6, 7}. A solution of the common CB is also applicable to another division manner.

Optionally, when the radio access network device supports the plurality of division manners, the method in this embodiment may further include: sending, by the radio access network device, a division indication to the terminal device, where the division indication is used to indicate one of the plurality of division manners; and receiving, by the terminal device, the division indication, and obtaining a division manner corresponding to the division indication.

In one manner, the division indication may be carried in the first scheduling information. In another manner, the division indication may be carried in higher layer signaling.

The radio access network device may notify the terminal device of a current specific division manner by using RRC signaling.

Optionally, the radio access network device may notify the terminal device of the current specific division manner by using physical layer signaling, for example, by using a PDCCH, or the division indication is directly carried in the first scheduling information. Further, the terminal device may directly determine the current specific division manner based on the division indication, or the terminal device may determine the current specific division manner based on the division indication and a preset rule. For example, the division indication is parsed based on a quantity of bits in a current TB or a quantity of time-frequency resources occupied by all CBs in a current TB. A specific parsing method may be, for example: when there is a relatively small quantity of bits in the TB or a relatively small quantity of occupied resources, an indication granularity of the division indication is relatively small; or when there is a relatively large quantity of bits in the TB or a relatively large quantity of occupied resources, an indication granularity of the division indication is relatively large.

Optionally, the radio access network device may notify the terminal device of a current specific division manner by using physical layer signaling and RRC signaling. Specifically, first, a quantity of division manners are configured for the terminal device by using the RRC signaling, and then, one division manner is determined from the quantity of division manners as the current division manner by using a PDCCH.

Optionally, in the foregoing embodiment, the retransmission indication information may be carried in the second scheduling information. In other words, the second scheduling information includes the retransmission indication information.

Optionally, when the first scheduling information and the second scheduling information are carried on control channels in a same downlink control information format, a first field in the downlink control information format that is used by the division indication and a second field in the downlink control information format that is used by the retransmission indication information include at least one same field. Generally, formats of downlink control information DCI (Downlink Control Information) used to schedule initial transmission and retransmission are the same, for example, DCI in a format 1. The format herein is one of a plurality of DCI formats of a PDCCH, and transmission modes of data channels scheduled by using different DCI formats may be different. For example, different DCI formats are usually used to schedule a single-antenna data channel and a multi-antenna data channel, but a specifically used DCI format is not limited in the present invention. The first scheduling information used to schedule the first TB includes the first field, and the first field indicates a division manner. In this case, the first scheduling information may not include the retransmission indication information. The second scheduling information used to schedule the retransmitted code block includes the second field, and the second field is used as the retransmission indication information. In this case, the second scheduling information may not indicate the division manner. Therefore, preferably, the first field and the second field may use a same field in the DCI format, for example, a 2-bit field. Certainly, the first field and the second field may be in a relationship of including each other, that is, the first field and the second field include a same field. For example, the first field includes two bits, and the second field includes three bits. In this case, the second field includes the first field. Alternatively, the first field and the second field may partially overlap. For example, the first field and the second field each include three bits, and two bits in the first field overlap two bits in the second field, and the first field and the second field each include one different bit.

For indication manners of the first field and the second field, in an embodiment, when the radio access network device sends the transport block to the terminal device in HARQ initial transmission, a particular first field (for example, two particular indication bits) in the first scheduling information (for example, control signaling in the downlink control information format DCI format 1) carried on a control channel used to schedule the initially transmitted transport block is used as a division indication of the transport block. When the radio access network device sends the retransmitted code block to the terminal device, the second field (for example, the foregoing two particular indication bits) in the second scheduling information (for example, control signaling in the downlink control format DCI format 1 or control signaling in another format, for example, a DCI format 1A) carried on a control channel used to schedule the retransmitted code block is used as the retransmission indication information. For example, during initial transmission, the two indication bits in the first field are used to indicate one division manner from four division manners (for example, including a time division manner based on a first granularity, a time division manner based on a second granularity, a frequency division manner based on a third granularity, and a frequency division manner based on a fourth granularity). During retransmission of the retransmitted code block, based on the foregoing selected division manner, the 2-bit field in the first field during initial transmission may be reused as the two indication bits in the second field, to further indicate which code block is the current retransmitted code block in this division manner.

In another embodiment, when the radio access network device sends the transport block to the terminal device in HARQ initial transmission, a particular first field (for example, two particular indication bits) in the first scheduling information (for example, control signaling in a downlink control format DCI format 1) carried on a control channel used to schedule the initially transmitted transport block is used as a division indication of the transport block. When the radio access network device sends the retransmitted code block to the terminal device, the second field (for example, the foregoing two indication bits in the first field) in the second scheduling information (for example, the control signaling in the downlink control format DCI format 1 or control signaling in another format, for example, a DCI format 1A) carried on a control channel used to schedule the retransmitted code block and several extra bits (for example, one extra particular indication bit) are used as the retransmission indication information. To be specific, the 3-bit second field of the retransmission indication information includes the two bits in the first field. Compared with a case in which the first field and the second field are the same, an advantage is as follows: An indication granularity of the retransmitted code block can be refined, or several indication cases of the retransmitted code block are added.

Preferably, the second field may include all or some of statuses represented by an MCS field. For a design of some retransmission indication information, an MCS field in the second scheduling information may be reused. Table 1 shows a parsing rule of a current MCS field. It can be learned that the current MCS field includes five bits and represents 32 statuses. Status indexes 0 to 28 respectively represent 29 MCS levels and are used for payload index querying. Three statuses represented by the MCS indexes 29 to 31, are mainly used to change a modulation order during retransmission scheduling. In addition, for initial transmission scheduling, the MCS indexes 0 to 28 and a time-frequency resource allocation field in control information are jointly used to determine a payload size of a transport block or a code block. For retransmission scheduling, because payload of a code block needs to be consistent with that during corresponding initial transmission, and a time-frequency resource occupied by current HARQ retransmission is indicated by using a dedicated field in the control information, for retransmission scheduling, at least the MCS indexes 0 to 28 are redundant, and the MCS indexes 29 to 31 are only used for changing a modulation order during retransmission. However, there is not a great need to change a modulation order during retransmission, and therefore, the MCS indexes 29 to 31 may be considered redundant.

TABLE 1

MCS parsing rule

| MCS index | Modulation order | Payload index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Optionally, the retransmission indication information is further used to indicate whether HARQ combination can be performed on all or some of code blocks in the retransmitted code block. For example, the second field or an extra field is used to further indicate whether to perform HARQ combination, so that a HARQ buffer pollution problem can be avoided in a scenario in which eMBB is punctured for URLLC or interfered with by URLLC.

Optionally, the retransmission indication information is further used to indicate the mode in which some code blocks are retransmitted or the mode in which all code blocks are retransmitted. In this solution, dynamic switching can be performed between retransmission of an entire transport block and retransmission of some code blocks in the transport block, and retransmission of the entire transport block may be indicated when a large quantity of code blocks are incorrectly received.

Optionally, the first feedback information further includes feedback information that corresponds to the first transport block and that is used to indicate a receiving status; and/or the second feedback information further includes feedback information that corresponds to the first transport block and that is used to indicate a receiving status.

In the conventional LTE system, before a plurality of CBs in a TB are separately coded, a CRC needs to be added. Specifically, first, TB CRC bits (generally, 24 TB CRC bits) need to be added to an original information bit of the TB, then the TB is segmented into the plurality of CBs, and next, a CB CRC (generally, 24 CB CRC bits need to be added to each CB) needs to be added to each CB. The two levels of CRC addition processing are intended to prevent the following cases: Decoding of all CBs passes the CB CRC check, but decoding of some CBs is actually incorrect, that is, a false alarm occurs in decoding of some CBs, and a false alarm probability increases as a quantity of CBs divided from the TB increases. Therefore, in addition to the CB CRC, the entire TB CRC is used as an extra layer of protection. In this way, even if all CB CRC checks succeed, the final TB CRC check fails when a false alarm occurs in some CBs.

A similar concept is also applicable to a case in which feedback is performed for some CBs and some CBs are retransmitted. Specifically:

Optionally, the terminal device further needs to feed back, in the first feedback information, the feedback information corresponding to the first transport block, that is, the first feedback information further includes the feedback information that corresponds to the first transport block and that is used to indicate the receiving status. For the first feedback information, feedback is performed, based on a division manner of an initially transmitted transport block, for CBGs obtained through division. For example, it is assumed that the TB includes four CBs, and the four CBs are divided into two CBGs, where a CB 1 and a CB 2 form a CBG 1, and a CB 3 and a CB 4 form a CBG 2. The terminal device separately performs decoding and a CB CRC check on each CB, and then generates feedback information of the CBG 1 for decoding and CRC check statuses of the CB 1 and the CB 2. For example, if the CB 1 and the CB 2 pass the CB CRC check, an ACK is fed back, or if either the CB 1 or the CB 2 fails in the CB CRC check, a NACK is fed back. Similar processing is performed for the CBG 2. To avoid a problem of a false alarm of a CB or a CBG, the terminal device further checks a decoding status of the entire TB through a TB CRC, to generate one extra piece of feedback information corresponding to the entire CB CRC. For example, even if both the CBG 1 and the CBG 2 pass all CB CRC checks, when the TB CRC fails, the terminal device generates a NACK for the feedback information corresponding to the TB CRC, and sends the NACK to the radio access network device. In this case, because the radio access network device considers that the entire TB is not correctly transmitted, it does not matter whether an ACK or a NACK is fed back in two feedback bits of the CBG 1 and the CBG 2. In this case, the radio access network device and the terminal device cannot know which CB CRC has a false alarm or which CB CRCs have false alarms.

Specifically, optimal feedback states of the foregoing case are as follows: feedback states corresponding to {CBG 1, CBG 2, TB} are respectively {ACK, ACK, ACK}, {ACK, NACK, NACK}, {NACK, ACK, NACK}, {NACK, NACK, NACK}, and {ACK, ACK, NACK}. In the last state, feedback information corresponding to each CB is an ACK, only the TB corresponds to a NACK, and it indicates that a CB CRC has a false alarm. In this case, generally, the radio access network device cannot assume that a particular CB is correctly received. An assumption manner depends on an internal implementation algorithm of the radio access network device. This special state is used to notify the radio access network device that the CB CRC has a false alarm.

For the other feedback states, the radio access network device can assume that a CBG corresponding to an ACK is correctly received.

Optionally, for feedback of the feedback information of the first transport block, the first feedback information may not include the feedback information corresponding to the first transport block, that is, the first feedback information does not include the feedback information that corresponds to the first transport block and that is used to indicate the receiving status. In another embodiment, the UE may formulate a rule rather than feeding back a TB-based ACK/NACK. The rule may includes: If the UE detects that the TB CRC fails, the UE feeds back a NACK for all CBGs regardless of receiving statuses of the plurality of CBGs obtained by dividing the TB. That is, for the foregoing example, the UE respectively feeds back one bit for each of the CBG 1 and the CBG 2, that is, feeds back a total of two bits, and does not need to feed back feedback information corresponding to the TB CRC. If the TB CRC fails, the UE feeds back {NACK, NACK} regardless of receiving statuses of the CBG 1 and the CBG 2. Alternatively, if the terminal device determines that receiving statuses corresponding to all CBs included in all CBGs are "correctly received", that is, decoding statuses of the CBs or CBGs pass the check, for example, pass the CB CRC or a CBG CRC or pass a check of a check matrix (a specific manner is not limited), but a decoding status of the entire TB fails in the check in this case, for example, fails in the TB CRC check or a check of a TB check matrix (a specific manner is not limited), the terminal device sets the decoding statuses corresponding to all CBGs to NACKs and reports the NACKs. For example, one TB is divided into two CBGs. If the terminal device determines, through a CB CRC or CBG CRC, that each CBG passes the check, that is, the terminal device can feed back two ACKs in this case, but if the TB CRC fails, the terminal device needs to report two NACKs, and does not need to report any other information for the TB. It can be learned that there should be a false alarm in at least one CBG in this case; that is, the CBG is actually not correctly decoded, but passes the check. But neither the terminal device nor the base station can determine which CB or CBG has a false alarm. Therefore, it makes sense that the terminal device reports a NACK for each CBG, that is, reports an all-NACK. For the base station, the base station receives the reported all-NACK, and does not need to distinguish between the following two statuses: In a first status, the CBGs all pass the check but the TB fails in the check, and in a second status, all the CBGs fail in decoding. In this case, for the base station, a preferable operation is to perform HARQ retransmission on all CBGs.

Optionally, the first feedback information includes CBG feedback information corresponding to each CBG and TB feedback information corresponding to the TB, and sending of the feedback information may be implemented through channel selection. Specifically, if all CBGs are correctly decoded or fail to be decoded, or all CBGs pass the check but the TB CRC check fails, the terminal device sends the feedback information, for example, an ACK or a NACK, corresponding to the TB on a first feedback channel resource, but does not send feedback information corresponding to the CBG on a second feedback channel resource. If some CBGs are correctly decoded, but the other CBG fails to be decoded, the terminal device sends feedback information corresponding to each CBG on a second feedback channel resource, but does not send feedback information corresponding to the TB on a first feedback channel resource or the second feedback channel resource. Further, optionally, a determining rule of the first feedback channel resource is different from a determining rule of the second feedback channel resource. For example, the first feedback channel resource is determined by using an implicit rule, and the second feedback channel resource is determined by using an explicit rule. The implicit rule includes: implicitly indicating the corresponding first feedback channel resource by using a resource of a downlink control channel used to schedule a TB or a CBG, and the explicit rule includes: explicitly indicating the second feedback channel resource by using higher layer signaling and/or physical layer signaling. Correspondingly, because the base station does not know specific statuses of decoding performed by the terminal device side on the TB and the CBG, the base station side needs to perform blind detection on the first feedback channel resource and the second feedback channel resource. Similarly, the foregoing solution may be extended to a method for sending the second feedback information.

The second feedback information corresponds to a case in which some CBs are retransmitted. Optionally, the terminal device further needs to feed back, in the second feedback information, the feedback information corresponding to the first transport block, that is, the second feedback information further includes the feedback information that corresponds to the first transport block and that is used to indicate the receiving status. In addition, this embodiment may be combined with two embodiments about the first feedback information, that is, the first feedback information includes the feedback information of the first transport block, or the first feedback information does not include the feedback information of the first transport block. Regardless of which embodiment is combined with this embodiment, optionally, a size of a codebook of the second feedback information may be equal to or less than a size of a codebook of the first feedback information. The size of the codebook herein is equivalent to a quantity of bits in an ACK/NACK in the feedback information for the first transport block or the retransmitted code block in the first transport block before coding.

For example, it is assumed that a TB includes six CBs, and the CBs are divided into three CBGs: {CB 1 and CB 2}, {CB 3 and CB 4}, and {CB 5 and CB 6}. It is assumed that no false alarm occurs when the terminal device feeds back the first feedback information. For example, a state fed back by the terminal device is {NACK, NACK, ACK, NACK}, and the radio access network device assumes that a CBG 3 is correctly received, and a CBG 1 and a CBG 2 are not correctly received. Then, the radio access network device retransmits CBs in the CBG 1 and the CBG 2 to the terminal device, and when coding the retransmitted CBs, the radio access network device does not add a TB CRC to the CB 1 to the CB 4, and the terminal device separately feeds back feedback information for the CBG 1, the CBG 2, and the TB. For example, in the foregoing example, after receiving the retransmitted CBG 1 and CBG 2, in addition to the feedback information for the CBG 1 and the CBG 2, the terminal device may further perform a TB CRC check on the CBG 1, the CBG 2, and the CBG 3, and feed back an ACK/NACK corresponding to the entire first TB.

It should be noted that the second feedback information needs to include the feedback information corresponding to the first TB, and a predetermined rule like the first feedback information cannot be used. Specifically, if the second feedback information does not include the feedback information corresponding to the first TB, but a solution of the predetermined rule like the first feedback information is used, that is, after the retransmitted code block is decoded, if it is determined that the TB CRC fails, a NACK is fed back for each retransmitted code block, but the feedback information corresponding to the first TB is not fed back. The radio access network device cannot distinguish between whether receiving statuses of all retransmitted code blocks are NACKs (in this case, the radio access network device subsequently needs to transmit only the retransmitted code block) and whether receiving statuses of all retransmitted code blocks are ACKs but the TB CRC fails. In the latter case, the radio access network device subsequently needs to retransmit all code blocks in the first TB due to a problem of a false alarm.

In another embodiment of the second feedback information, a size of a codebook of the second feedback information is equal to a size of a codebook of the first feedback information. A method in which an all-NACK is reported when all CBGs pass the check but the TB fails in the check is also applicable to this embodiment. For example, one TB is divided into two CBGs. First feedback information for initial transmission includes an ACK corresponding to a CBG 1 and a NACK corresponding to a CBG 2. Next, the base station retransmits the CBG 2. If decoding performed by the terminal device on the CBG 2 passes a check, but decoding of the TB including the CBG 1 and the CBG 2 fails a check, when the terminal device performs HARQ feedback for retransmission of the CBG, a size of a codebook is still two bits. Specifically, as in the foregoing embodiment, two NACKs, that is, an all-NACK, are fed back.

In another embodiment about a size of a codebook of feedback information, a size of an ACK/NACK codebook of the first feedback information is greater than or equal to a size of an ACK/NACK codebook of the second feedback information. Specifically, it is assumed that in a TB, a CB 1 and a CB 2 form a CBG 1, a CB 3 and a CB 4 form a CBG 2, a CB 5 and a CB 6 form a CBG 3, and a CB 7 and a CB 8 form a CBG 4 is used, and a TB-based ACK/NACK is not fed back; and that a size of an ACK/NACK codebook is 4, for example, {ACK, ACK, ACK, NACK} respectively corresponding to the four CBGs. Then, when feedback is performed for retransmission of CBs in the CBG 4, four bits are fed back, and in this case, may be {ACK, DTX, DTX, DTX} or {DTX, DTX, DTX, ACK}. The DTX may be understood as an occupied bit that does not correspond to any CBG. Certainly, for the second feedback information, there may be no need to reserve bit locations for all CBGs in an ACK/NACK codebook. In this case, the size of the codebook of the second feedback information may be less than the size of the codebook of the first feedback information.

Optionally, when the size of the codebook of the first feedback information is equal to the size of the codebook of the second feedback information, the second feedback information further includes feedback information corresponding to the second TB and/or feedback information corresponding to CBs in the second TB.

In another embodiment about a size of a codebook of feedback information, if a same size of an ACK/NACK codebook is used, when some CBs are retransmitted, another TB may be transmitted. It is assumed that the another TB is a TB 2 or a second TB, and the TB 2 includes two CBGs. When feedback is performed for the CBG 4 in the TB 1, two bits corresponding to two CBGs in the TB 2 are fed back together. That is, three bits that are fed back are {ACK, DTX, ACK, NACK}, and feedback locations respectively correspond to the CBG 4 in the TB 1, an occupied bit, the CBG 1 in the TB 2, and the CBG 2 in the TB 2. It can be learned that feedback bits corresponding to the two CBGs in the TB 2 are located in a tail part of the ACK/NACK codebook. In this way, an ACK/NACK location of the CBG in the TB1 may not be affected, and a problem of inconsistency between the base station and the UE in understanding of bits in the ACK/NACK codebook is avoided. Another method for placing ACK/NACKs corresponding to the TB 2 is not excluded provided that feedback locations corresponding to different TBs do not depend on each other. For example, {ACK, DTX, NACK, ACK} respectively correspond to the CBG 4 in the TB 1, an occupied bit, the CBG 2 in the TB 2, and the CBG 1 in the TB 2.

Optionally, when certain feedback information in the first feedback information is an ACK, the certain feedback information corresponds to a certain code block set in the at least two code block sets, and a code block set corresponding to the retransmitted code block does not include the certain code block set, when the terminal device feeds back the second feedback information, the terminal device fills, with a NACK, in a bit location corresponding to the certain code block set in the codebook of the second feedback information. Specifically, for a CBG for which an ACK is fed back when an AKC/NACK is fed back for initial transmission, considering that incorrect feedback is performed for the second TB or CBs in the second TB because joint feedback is performed for retransmission of some CBs and feedback information of the second TB, NACK filling is performed, during retransmission of the CBs, for the CBG corresponding to the previous ACK. For example, if the radio access network device schedules the second TB, but the terminal device loses control information used to schedule the second TB, if a location of the particular code block set is still filled with an ACK like the previously fed back ACK, the radio access network device mistakes the ACK as an ACK corresponding to the second TB. In this way, the radio access network device and the terminal device may be inconsistent with each other in understanding of the feedback information, and a physical layer packet loss event of the second TB is caused.

Optionally, the feedback information corresponding to the at least two code block sets in the first feedback information is fed back at different moments, or the feedback information corresponding to the retransmitted code blocks in the second feedback information is fed back at different moments.

Figure 8:
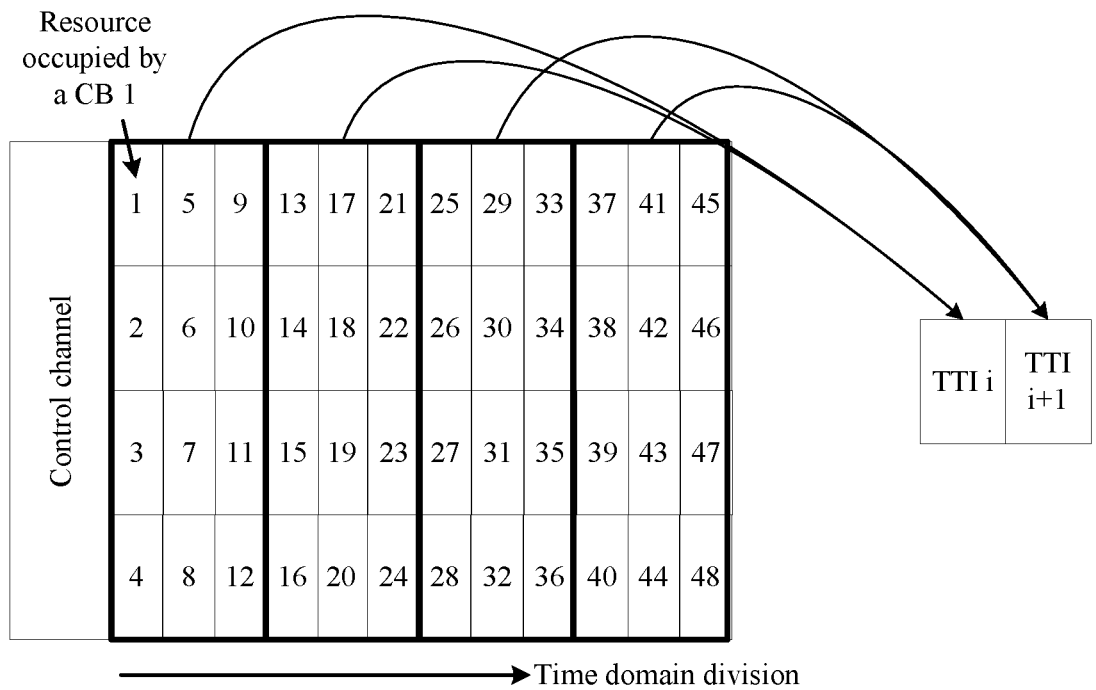
FIG. 8 is a schematic diagram showing that feedback information of different code block groups is fed back at different moments according to an embodiment of the present invention.

Description is provided by using the first feedback information as an example, and similar processing is used in a solution of the second feedback information. Specifically, as shown in FIG. 8, it is assumed that a time division manner of using three time domain symbols as a granularity is used, and the first TB is divided into four CBGs through time division. Because a resource mapping rule of the CBs is frequency-first time-second mapping, different elements may be decoded sequentially according to a buffering time sequence without waiting until all CBs are buffered for joint processing. Then, for a CB corresponding to an element that is mapped and sent first, the terminal device may decode the CB first. For a CB corresponding to an element that is mapped and sent later, the terminal device may decode the CB later. In this way, for the CB that is decoded first, the terminal device may generate and send feedback information first. Similarly, for the CB that is decoded later, the terminal device may generate and send feedback information later. For example, the terminal device may send the feedback information at different moments or in different transmission time intervals TTIs. Correspondingly, the radio access network device may sequentially receive, at different moments or in different TTIs, the feedback information sent by the terminal device, to accelerate a subsequent pipeline processing procedure of the radio access network device side.

Corresponding to the foregoing method, the present invention provides embodiments of a terminal device and a radio access network device. The terminal device and the radio access network device may respectively perform the steps in the foregoing method embodiment.

Figure 9:
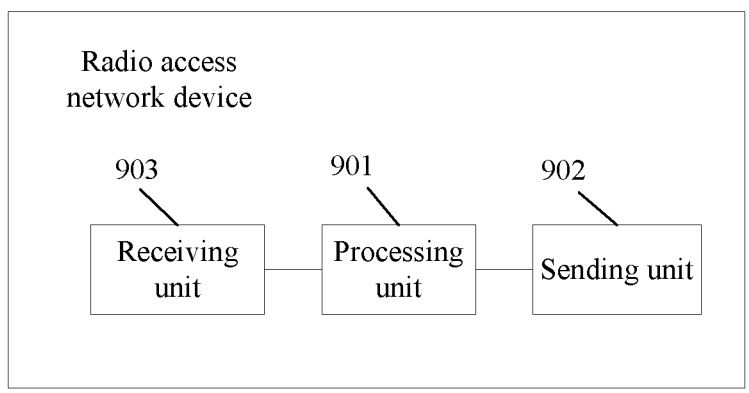
FIG. 9 is a schematic structural diagram of an embodiment of a radio access network device according to the present invention.

Referring to FIG. 9, the present invention provides an embodiment of a radio access network device, including:

a processing unit 901, configured to divide at least two code blocks included in a first transport block into at least two different code block sets based on a division manner, where each code block set includes at least one of the at least two code blocks;

a sending unit 902, configured to send the first transport block to a terminal device; and a receiving unit 903, configured to receive first feedback information sent by the terminal device, where the first feedback information includes at least two pieces of feedback information corresponding to the first transport block, and the at least two pieces of feedback information are respectively used to indicate receiving statuses of the at least two code block sets.

Optionally, the sending unit is further configured to send a retransmitted code block to the terminal device, where the retransmitted code block includes some or all of code blocks included in a code block set corresponding to negative acknowledgement information in the first feedback information; and the receiving unit is further configured to receive second feedback information sent by the terminal device, where the second feedback information includes feedback information that corresponds to the retransmitted code block and that is used to indicate a receiving status.

Optionally, the sending unit is further configured to send retransmission indication information to the terminal device, where the retransmission indication information is used to determine the retransmitted code block.

For detailed descriptions of the first transport block, the code block set, the division manner, and the retransmitted code block in this embodiment, refer to the foregoing method embodiment.

Optionally, when the radio access network device supports a plurality of division manners, the sending unit is further configured to send, to the terminal device, first scheduling information used to schedule the first transport block, where the first scheduling information includes a division indication, and the division indication is used to indicate one of the plurality of division manners; or the sending unit is further configured to send higher layer signaling to the terminal device, where the higher layer signaling includes a division indication, and the division indication is used to indicate one of the plurality of division manners.

Optionally, the sending unit is further configured to send, to the terminal device, second scheduling information used to schedule the retransmitted code block, where the second scheduling information includes the retransmission indication information.

Optionally, the first scheduling information and the second scheduling information are carried on control channels in a same downlink control information format, and a first field that is in the downlink control information format and that is used by the division indication and a second field that is in the downlink control information format and that is used by the retransmission indication information include a same field.

Optionally, the retransmission indication information is further used to indicate whether HARQ combination can be performed on all or some of code blocks in the retransmitted code block.

Optionally, the first feedback information further includes feedback information used to indicate a receiving status of the first transport block; and/or the second feedback information further includes feedback information used to indicate a receiving status of the first transport block.

For definitions and specific implementations of the first feedback information, the retransmission indication information, the first scheduling information, and the second scheduling information in this embodiment, refer to related descriptions of the foregoing method embodiment.

Figure 10:
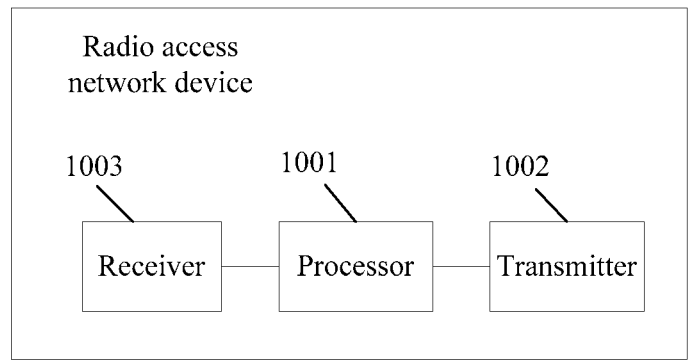
FIG. 10 is a schematic structural diagram of another embodiment of a radio access network device according to the present invention.

Referring to FIG. 10, hardware elements of the radio access network device include:

a processor 1001, configured to divide at least two code blocks included in a first transport block into at least two different code block sets based on a division manner, where each code block set includes at least one of the at least two code blocks;

a transmitter 1002, configured to send the first transport block to a terminal device; and a receiver 1003, configured to receive first feedback information sent by the terminal device, where the first feedback information includes at least two pieces of feedback information corresponding to the first transport block, and the at least two pieces of feedback information are respectively used to indicate receiving statuses of the at least two code block sets.

Optionally, the transmitter is further configured to send a retransmitted code block to the terminal device, where the retransmitted code block includes some or all of code blocks included in a code block set corresponding to negative acknowledgement information in the first feedback information; and the receiver is further configured to receive second feedback information sent by the terminal device, where the second feedback information includes feedback information that corresponds to the retransmitted code block and that is used to indicate a receiving status.

Optionally, the transmitter is further configured to send retransmission indication information to the terminal device, where the retransmission indication information is used to determine the retransmitted code block.

For detailed descriptions of the first transport block, the code block set, the division manner, and the retransmitted code block in this embodiment, refer to the foregoing method embodiment.

Optionally, when the radio access network device supports the plurality of division manners, the transmitter is further configured to send, to the terminal device, first scheduling information used to schedule the first transport block, where the first scheduling information includes a division indication, and the division indication is used to indicate one of the plurality of division manners; or the transmitter is further configured to send higher layer signaling to the terminal device, where the higher layer signaling includes a division indication, and the division indication is used to indicate one of the plurality of division manners.

Optionally, the transmitter is further configured to send, to the terminal device, second scheduling information used to schedule the retransmitted code block, where the second scheduling information includes the retransmission indication information.

Optionally, the first scheduling information and the second scheduling information are carried on control channels in a same downlink control information format, and a first field that is in the downlink control information format and that is used by the division indication and a second field that is in the downlink control information format and that is used by the retransmission indication information include a same field.

Optionally, the retransmission indication information is further used to indicate whether HARQ combination can be performed on all or some of code blocks in the retransmitted code block.

Optionally, the first feedback information further includes feedback information used to indicate a receiving status of the first transport block; and/or the second feedback information further includes feedback information used to indicate a receiving status of the first transport block.

For definitions and specific implementations of the first feedback information, the retransmission indication information, the first scheduling information, and the second scheduling information in this embodiment, refer to related descriptions of the foregoing method embodiment.

Figure 11:
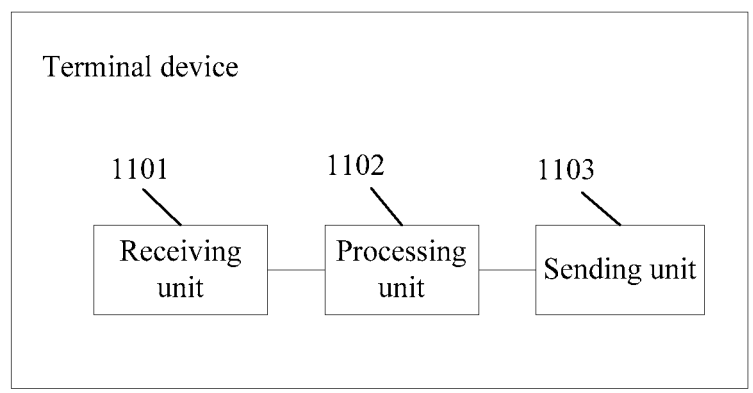
FIG. 11 is a schematic structural diagram of an embodiment of a terminal device according to the present invention.

Referring to FIG. 11, the present invention provides a terminal device, including:

a receiving unit 1101, configured to receive a first transport block sent by a radio access network device, where the first transport block includes at least two code blocks, the at least two code blocks are divided into at least two different code block sets based on a division manner, and each code block set includes at least one of the at least two code blocks;

a processing unit 1102, configured to generate first feedback information, where the first feedback information includes at least two pieces of feedback information corresponding to the first transport block, and the at least two pieces of feedback information are respectively used to indicate receiving statuses of the at least two code block sets; and a sending unit 1103, configured to send the first feedback information to the radio access network device.

Optionally, the receiving unit is further configured to receive a retransmitted code block sent by the radio access network device, where the retransmitted code block includes some or all of code blocks included in a code block set corresponding to negative acknowledgement information in the first feedback information; and the sending unit is further configured to send second feedback information to the radio access network device, where the second feedback information includes feedback information that corresponds to the retransmitted code block and that is used to indicate a receiving status.

Optionally, the receiving unit is further configured to receive retransmission indication information sent by the radio access network device, where the retransmission indication information is used to determine the retransmitted code block; and the receiving unit receives the retransmitted code block based on the division manner and the retransmission indication information.

For detailed descriptions of the first transport block, the code block set, the division manner, and the retransmitted code block in this embodiment, refer to the foregoing method embodiment.

Optionally, when the radio access network device supports a plurality of division manners, the receiving unit is further configured to receive first scheduling information that is sent by the radio access network device and that is used to schedule the first transport block, where the first scheduling information includes a division indication, and the division indication is used to indicate one of the plurality of division manners; or the receiving unit is further configured to receive higher layer signaling sent by the radio access network device, where the higher layer signaling includes a division indication, and the division indication is used to indicate one of the plurality of division manners.

Optionally, the receiving unit is further configured to receive second scheduling information that is sent by the radio access network device and that is used to schedule the retransmitted code block, where the second scheduling information includes the retransmission indication information.

Optionally, the first scheduling information and the second scheduling information are carried on control channels in a same downlink control information format, and a first field that is in the downlink control information format and that is used by the division indication and a second field that is in the downlink control information format and that is used by the retransmission indication information include a same field.

Optionally, the retransmission indication information is further used to indicate whether HARQ combination can be performed on all or some of code blocks in the retransmitted code block.

Optionally, the first feedback information further includes feedback information used to indicate a receiving status of the first transport block; and/or the second feedback information further includes feedback information used to indicate a receiving status of the first transport block.

For definitions and specific implementations of the first feedback information, the retransmission indication information, the first scheduling information, and the second scheduling information in this embodiment, refer to related descriptions of the foregoing method embodiment.

Figure 12:
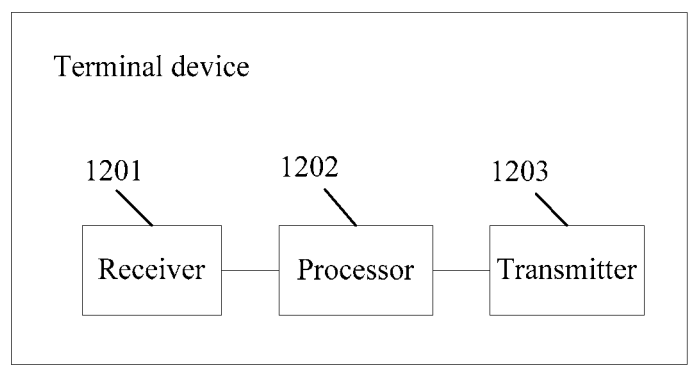
FIG. 12 is a schematic structural diagram of another embodiment of a terminal device according to the present invention.

Referring to FIG. 12, hardware elements of the terminal device include:

a receiver 1201, configured to receive a first transport block sent by a radio access network device, where the first transport block includes at least two code blocks, the at least two code blocks are divided into at least two different code block sets based on a division manner, and each code block set includes at least one of the at least two code blocks;

a processor 1202, configured to generate first feedback information, where the first feedback information includes at least two pieces of feedback information corresponding to the first transport block, and the at least two pieces of feedback information are respectively used to indicate receiving statuses of the at least two code block sets; and a transmitter 1203, configured to send the first feedback information to the radio access network device.

Optionally, the receiver is further configured to receive a retransmitted code block sent by the radio access network device, where the retransmitted code block includes some or all of code blocks included in a code block set corresponding to negative acknowledgement information in the first feedback information; and the transmitter is further configured to send second feedback information to the radio access network device, where the second feedback information includes feedback information that corresponds to the retransmitted code block and that is used to indicate a receiving status.

Optionally, the receiver is further configured to receive retransmission indication information sent by the radio access network device, where the retransmission indication information is used to determine the retransmitted code block; and the receiver receives the retransmitted code block based on the division manner and the retransmission indication information.

For detailed descriptions of the first transport block, the code block set, the division manner, and the retransmitted code block in this embodiment, refer to the foregoing method embodiment.

Optionally, when the radio access network device supports a plurality of division manners, the receiver is further configured to receive first scheduling information that is sent by the radio access network device and that is used to schedule the first transport block, where the first scheduling information includes a division indication, and the division indication is used to indicate one of the plurality of division manners; or the receiver is further configured to receive higher layer signaling sent by the radio access network device, where the higher layer signaling includes a division indication, and the division indication is used to indicate one of the plurality of division manners.

Optionally, the receiver is further configured to receive second scheduling information that is sent by the radio access network device and that is used to schedule the retransmitted code block, where the second scheduling information includes the retransmission indication information.

Optionally, the first scheduling information and the second scheduling information are carried on control channels in a same downlink control information format, and a first field that is in the downlink control information format and that is used by the division indication and a second field that is in the downlink control information format and that is used by the retransmission indication information include a same field.

Optionally, the retransmission indication information is further used to indicate whether HARQ combination can be performed on all or some of code blocks in the retransmitted code block.

Optionally, the first feedback information further includes feedback information used to indicate a receiving status of the first transport block; and/or the second feedback information further includes feedback information used to indicate a receiving status of the first transport block.

For definitions and specific implementations of the first feedback information, the retransmission indication information, the first scheduling information, and the second scheduling information in this embodiment, refer to related descriptions of the foregoing method embodiment.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present invention may be integrated into one processing unit, or each of the units may exist alone physically, or two or more units are integrated into one unit. For example, the receiver and the transmitter in the foregoing specification may be physically integrated into one module, for example, a transceiver or an antenna.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, DVD), a semiconductor medium (for example, a Solid State Disk (SSD)), or the like.

What is claimed is:

1. A data transmission method, comprising:
   receiving, by a terminal device, a first transport block from a radio access network device, wherein the first transport block comprises at least two code blocks, wherein the at least two code blocks are divided into at least two different code block groups, and wherein each code block group comprises at least one of the at least two code blocks; and
   sending, by the terminal device, first feedback information to the radio access network device, wherein the first feedback information comprises at least two pieces of feedback information corresponding to the first transport block, wherein the at least two pieces of feedback information are respectively used to indicate receiving statuses of the at least two code block groups, and wherein each of the at least two pieces of feedback information in the first feedback information indicates a receiving status of negative acknowledgement information when the terminal device determines that each of the at least two code block groups passes decoded check but the first transport block fails in decoded check.

2. The method according to claim 1, further comprising:
   receiving, by the terminal device, a retransmitted code block from the radio access network device, wherein the retransmitted code block comprises one or more code blocks comprised in a code block group corresponding to negative acknowledgement information in the first feedback information; and
   sending, by the terminal device, second feedback information to the radio access network device, wherein the second feedback information comprises feedback information that corresponds to the retransmitted code block and that is used to indicate a receiving status.

3. The method according to claim 2, wherein each piece of feedback information in the second feedback information indicates the receiving status of negative acknowledgement information when the terminal device determines that each of the at least two code block groups passes decoded check but the first transport block fails in decoded check.

4. The method according to claim 3, wherein a size of a codebook of the second feedback information equals to a size of a codebook of the first feedback information, and wherein the size of the codebook of the first feedback information equals to the number of code block groups in the first transport block.

5. The method according to claim 2, further comprising:
receiving, by the terminal device, retransmission indication information from the radio access network device, wherein the retransmission indication information is used to determine the retransmitted code block; and
receiving, by the terminal device, the retransmitted code block based on the retransmission indication information.

6. The method according to claim 5, wherein the retransmission indication information is further used to indicate whether HARQ combination can be performed on the one or more code blocks in the retransmitted code block.

7. The method according to claim 1, the method further comprises:
receiving, by the terminal device, first scheduling information that is from the radio access network device and that is used to schedule the first transport block, wherein the first scheduling information comprises a division indication, and wherein the division indication is used to indicate a division manner of the first transport block; or
receiving, by the terminal device, higher layer signaling from the radio access network device, wherein the higher layer signaling comprises a division indication, and wherein the division indication is used to indicate a division manner of the first transport block.

8. The method according to claim 7, wherein the method further comprises:
receiving, by the terminal device, second scheduling information that is from the radio access network device and that is used to schedule the retransmitted code block, wherein the second scheduling information comprises retransmission indication information.

9. A data transmission device, comprising:
at least one processor and a memory storing program instructions;
wherein when executed by the at least one processor, the program instructions enable the data transmission device to perform the following steps:
receiving a first transport block from a radio access network device, wherein the first transport block comprises at least two code blocks, wherein the at least two code blocks are divided into at least two different code block groups, and wherein each code block group comprises at least one of the at least two code blocks; and
sending first feedback information to the radio access network device, wherein the first feedback information comprises at least two pieces of feedback information corresponding to the first transport block, wherein the at least two pieces of feedback information are respectively used to indicate receiving statuses of the at least two code block groups, and wherein each of the at least two pieces of feedback information in the first feedback information indicates a receiving status of negative acknowledgement information when the data transmission device determines that each of the at least two code block groups passes decoded check but the first transport block fails in decoded check.

10. The data transmission device according to claim 9, wherein the data transmission device is further enabled to perform the step of:
receiving a retransmitted code block from the radio access network device, wherein the retransmitted code block comprises one or more code blocks comprised in a code block group corresponding to negative acknowledgement information in the first feedback information; and
sending second feedback information to the radio access network device, wherein the second feedback information comprises feedback information that corresponds to the retransmitted code block and that is used to indicate a receiving status, wherein a size of a codebook of the second feedback information equals to a size of a codebook of the first feedback information, and wherein the size of the codebook of the first feedback information equals to the number of code block groups in the first transport block.

11. The data transmission device according to claim 10, wherein each piece of feedback information in the second feedback information indicates the receiving status of negative acknowledgement information when the data transmission device determines that each of the at least two code block groups passes decoded check but the first transport block fails in decoded check.

12. The data transmission device according to claim 10, wherein the data transmission device is further enabled to perform the step of:
receiving retransmission indication information from the radio access network device, wherein the retransmission indication information is used to determine the retransmitted code block; and
receiving the retransmitted code block based on the retransmission indication information.

13. The data transmission device according to claim 12, wherein the retransmission indication information is further used to indicate whether HARQ combination can be performed on the one or more code blocks in the retransmitted code block.

14. The data transmission device according to claim 9, wherein the data transmission device is further enabled to perform the step of:
receiving first scheduling information that is from the radio access network device and that is used to schedule the first transport block, wherein the first scheduling information comprises a division indication, and wherein the division indication is used to indicate a division manner of the first transport block; or
receiving higher layer signaling from the radio access network device, wherein the higher layer signaling comprises a division indication, and wherein the division indication is used to indicate a division manner of the first transport block.

15. The data transmission device according to claim 14, wherein the data transmission device is further enabled to perform the step of:
receiving second scheduling information from the radio access network device that is used to schedule the retransmitted code block, wherein the second scheduling information comprises retransmission indication information.

16. A non-transitory computer readable storage medium storing computer program codes which, when executed by at least one processor of a communication device, cause the communication device to perform the steps of:

receiving a first transport block from a radio access network device, wherein the first transport block comprises at least two code blocks, wherein the at least two code blocks are divided into at least two different code block groups, and wherein each code block group comprises at least one of the at least two code blocks; and sending first feedback information to the radio access network device, wherein the first feedback information comprises at least two pieces of feedback information corresponding to the first transport block, wherein the at least two pieces of feedback information are respectively used to indicate receiving statuses of the at least two code block groups, and wherein each of the at least two pieces of feedback information in the first feedback information indicates a receiving status of negative acknowledgement information when the data transmission device determines that each of the at least two code block groups passes decoded check but the first transport block fails in decoded check.

17. The non-transitory computer readable storage medium according to claim 16, wherein the communication device is further enabled to perform the step of:

receiving a retransmitted code block from the radio access network device, wherein the retransmitted code block comprises one or more code blocks comprised in a code block group corresponding to negative acknowledgement information in the first feedback information; and sending second feedback information to the radio access network device, wherein the second feedback information comprises feedback information that corresponds to the retransmitted code block and that is used to indicate a receiving status, wherein a size of a codebook of the second feedback information equals to a size of a codebook of the first feedback information, and wherein the size of the codebook of the first feedback information equals to the number of code block groups in the first transport block.

18. The non-transitory computer readable storage medium according to claim 17, wherein each piece of feedback information in the second feedback information indicates the receiving status of negative acknowledgement information when the communication device determines that each of the at least two code block groups passes decoded check but the first transport block fails in decoded check.

19. The non-transitory computer readable storage medium according to claim 17, wherein the communication device is further enabled to perform the step of:

receiving retransmission indication information from the radio access network device, wherein the retransmission indication information is used to determine the retransmitted code block; and receiving the retransmitted code block based on the retransmission indication information.

20. The non-transitory computer readable storage medium according to claim 19, wherein the retransmission indication information is further used to indicate whether HARQ combination can be performed on the one or more code blocks in the retransmitted code block.

* * * * *